(12) United States Patent
Tomisawa

(10) Patent No.: US 9,661,576 B2
(45) Date of Patent: May 23, 2017

(54) RADIO TRANSMITTING APPARATUS AND RADIO RECEIVING APPARATUS TO MONITOR RESIDUAL CAPACITY OF A BATTERY

(71) Applicant: Renesas Electronics Corporation, Tokyo (JP)

(72) Inventor: Satoru Tomisawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/980,352

(22) Filed: Dec. 28, 2015

(65) Prior Publication Data

US 2016/0262105 A1    Sep. 8, 2016

(30) Foreign Application Priority Data

Mar. 4, 2015  (JP) ................................. 2015-042517

(51) Int. Cl.
| | |
|---|---|
| *H04W 4/00* | (2009.01) |
| *H04W 52/02* | (2009.01) |
| *H04W 4/20* | (2009.01) |
| *H04W 52/24* | (2009.01) |
| *H04W 52/04* | (2009.01) |

(52) U.S. Cl.
CPC ....... *H04W 52/0251* (2013.01); *H04W 4/008* (2013.01); *H04W 4/206* (2013.01); *H04W 52/04* (2013.01); *H04W 52/245* (2013.01); *H04W 52/247* (2013.01); *Y02B 60/50* (2013.01)

(58) Field of Classification Search
CPC ......... H04W 4/00; H04W 4/021; H04W 4/20; H04W 52/0206; H04W 52/0261; H04W 4/008; H04B 1/04
USPC .................................. 455/115.1, 115.3, 127.1
See application file for complete search history.

(56) References Cited

U.S. PATENT DOCUMENTS

| | | | |
|---|---|---|---|
| 6,396,407 B1 | 5/2002 | Kobayashi | |
| 7,283,844 B2 * | 10/2007 | Thompson | ............. H01Q 1/246 455/428 |
| 9,063,212 B2 * | 6/2015 | Jones, Jr. | ............... G01S 5/0226 |
| 2012/0258741 A1 * | 10/2012 | Tillson | .................... G01S 3/046 455/457 |

(Continued)

FOREIGN PATENT DOCUMENTS

JP    2001-015179 A    1/2001

*Primary Examiner* — Blane Jackson
(74) *Attorney, Agent, or Firm* — Mattingly & Malur, PC

(57) ABSTRACT

A radio apparatus that allows a user to check a state of a power supply is provided. A radio transmitting apparatus 10 includes a power supply voltage measurement unit 11 that measures a power supply voltage, a transmission power determination unit 12 that determines a transmission power based on the power supply voltage that has been measured, and a radio transmitting unit 13 that transmits by radio an advertisement packet including transmission power information indicating the transmission power that has been determined at the transmission power that has been determined. A radio receiving apparatus 20 includes a radio receiving unit 23 that receives the advertisement packet and a power supply state detection unit 21 that detects the state of the power supply of the radio transmitting apparatus 10 based on the transmission power information included in the advertisement packet.

18 Claims, 17 Drawing Sheets

(56) References Cited

U.S. PATENT DOCUMENTS

| | | | |
|---|---|---|---|
| 2015/0296371 A1* | 10/2015 | Kong | H04W 8/22 |
| | | | 455/419 |
| 2016/0050564 A1* | 2/2016 | Niewczas | H04W 4/008 |
| | | | 455/411 |
| 2016/0099758 A1* | 4/2016 | Bell | H04B 5/0037 |
| | | | 307/104 |
| 2016/0119320 A1* | 4/2016 | Bansal | H04W 12/12 |
| | | | 705/14.26 |
| 2016/0192216 A1* | 6/2016 | Govindarajan | G06Q 10/0635 |
| | | | 705/7.28 |

* cited by examiner

| Case | 1 | 2 | 3 |
|---|---|---|---|
| SW1 | H | L | L |
| SW2 | L | H | L |
| SW3 | L | L | H |
| Vout | 1/2*Vin | 1/4*Vin | 1/8*Vin |

RADIO TRANSMITTING APPARATUS AND RADIO RECEIVING APPARATUS TO MONITOR RESIDUAL CAPACITY OF A BATTERY

CROSS-REFERENCE TO RELATED APPLICATIONS

This application is based upon and claims the benefit of priority from Japanese patent application No. 2015-042517, filed on Mar. 4, 2015, the disclosure of which is incorporated herein in its entirety by reference.

BACKGROUND

The present invention relates to a radio transmitting apparatus and a radio receiving apparatus, and can be suitably used, for example, for a radio transmitting apparatus and a radio receiving apparatus that control a transmission power.

In order to perform radio communications between various types of electronic devices, radio communication standards such as Bluetooth (registered trademark) have been widely used. In Bluetooth LE (Low Energy) (Bluetooth Smart) (IEEE 802.15.1 standard) that has been recently standardized, in particular, a large amount of power can be saved. It is thus expected that Bluetooth LE will be used in a wider variety of devices.

In general, such an electronic device includes a battery, which is a power supply, and displays a residual capacity of the battery to inform a user of the time to change the battery. As related art, Patent Literature 1 is known, for example.

[Patent Literature 1] Japanese Unexamined Patent Application Publication No. 2001-15179

SUMMARY

In the related art as disclosed in Patent Literature 1, an electronic device blinks or lights up an LED (LED lamp) according to a power supply voltage to display a residual capacity of a battery. However, since the electronic devices that can perform radio communications stated above are used in various environments, the user may not able to see the display of the LED.

Therefore, there is one problem that the user cannot check the state of the power supply of the radio apparatus since the user cannot see the display unit such as the LED depending on the environments in which the radio apparatus, which is the electronic device, is used.

The other problems of the related art and the novel characteristics of the present invention will be made apparent from the descriptions of the specification and the accompanying drawings.

According to one embodiment, a radio transmitting apparatus includes a power supply voltage measurement unit, a transmission power determination unit, and a radio transmitting unit. The power supply voltage measurement unit measures a power supply voltage and the transmission power determination unit determines a transmission power based on the power supply voltage that has been measured. The radio transmitting unit transmits by radio an advertisement packet including transmission power information indicating the transmission power that has been determined based on the transmission power that has been determined.

Further, according to another embodiment, the transmission power determination unit may determine the transmission power based on a result of comparing a predetermined value with a value based on the power supply voltage that has been measured and the radio transmitting unit may decrease the power to be transmitted based on the transmission power that has been determined.

According to one embodiment, a radio receiving apparatus includes a radio receiving unit and a power supply state detection unit. The radio receiving unit receives an advertisement packet transmitted from a radio transmitting apparatus. The power supply state detection unit detects a state of a power supply of the radio transmitting apparatus based on transmission power information included in the advertisement packet.

According to another embodiment, a received signal strength measurement unit that measures a received signal strength of a radio signal that has been received may be included and a power supply state detection unit may detect a state of a power supply of a radio transmitting apparatus based on a result of comparing a predetermined value with the received signal strength that has been measured.

A method or a system used in place of the apparatus according to the above embodiments, a program that causes a computer to execute some or all of the processing of this apparatus, an imaging apparatus including this apparatus and the like are effective as aspects of the present invention.

According to the embodiment, it is possible to check the state of the power supply of the radio apparatus.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1A:
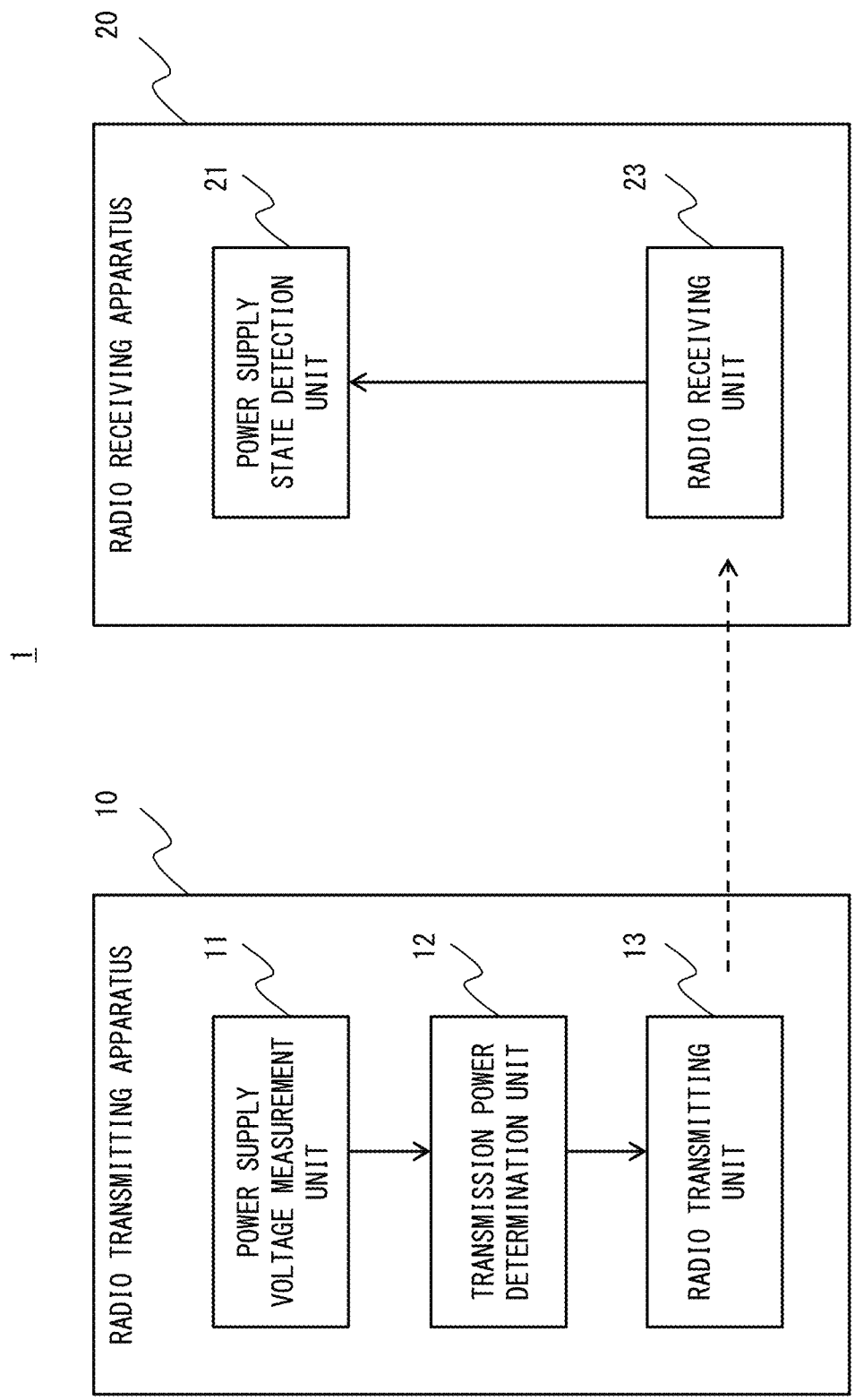
FIG. 1A is a configuration diagram showing one example of a schematic configuration of a radio communication system according to an embodiment.

For the clarification of the description, the following description and the drawings may be omitted or simplified as appropriate. Further, each element shown in the drawings as functional blocks that perform various processing can be formed of a CPU, a memory, and other circuits in hardware and may be implemented by programs loaded in the memory in software. Those skilled in the art will therefore understand that these functional blocks may be implemented in various ways by only hardware, only software, or the combination thereof without any limitation. Throughout the drawings, the same components are denoted by the same reference symbols and overlapping descriptions will be omitted as appropriate.

(Discussion on how Embodiments were Achieved)

Figures 13, 14:
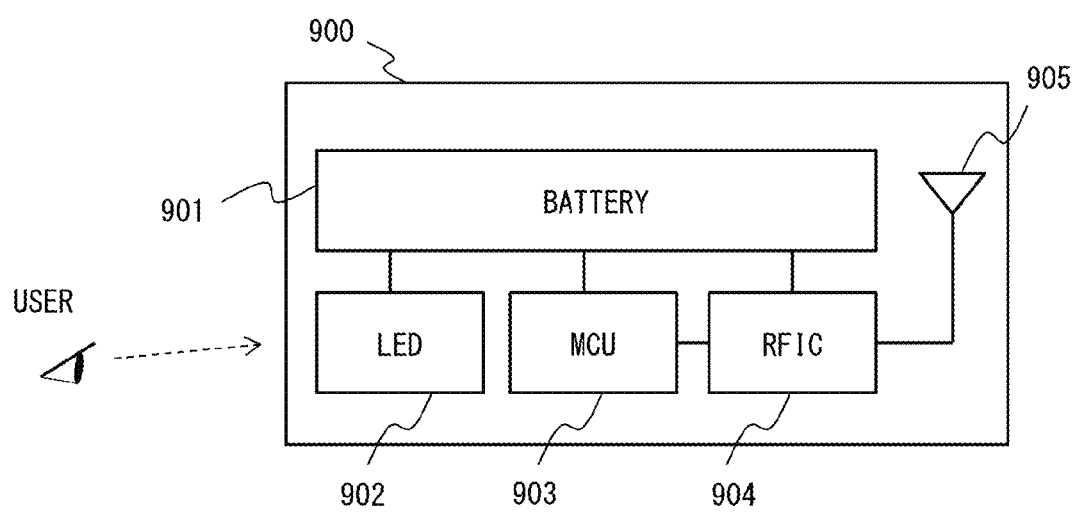
FIG. 13 is an input-output table showing an operation example of the attenuator according to the varied example of the embodiment.
FIG. 14 is a configuration diagram showing a configuration of a short-range wireless device according to a reference example.

FIG. 14 shows a configuration of a short-range wireless device according to a reference example. As shown in FIG. 14, a short-range wireless device 900 according to the reference example includes a battery 901, an LED 902, an MCU 903, an RFIC 904, and an antenna 905. In the short-range wireless device 900 according to the reference example, an output voltage of a battery decreases as the amount of charges accumulated in the battery 901 decreases. Therefore, when the output voltage of the battery is below a desired voltage value, the LED 902 is lighted up/blinked to notify a user of the time to change the battery.

Figure 15:
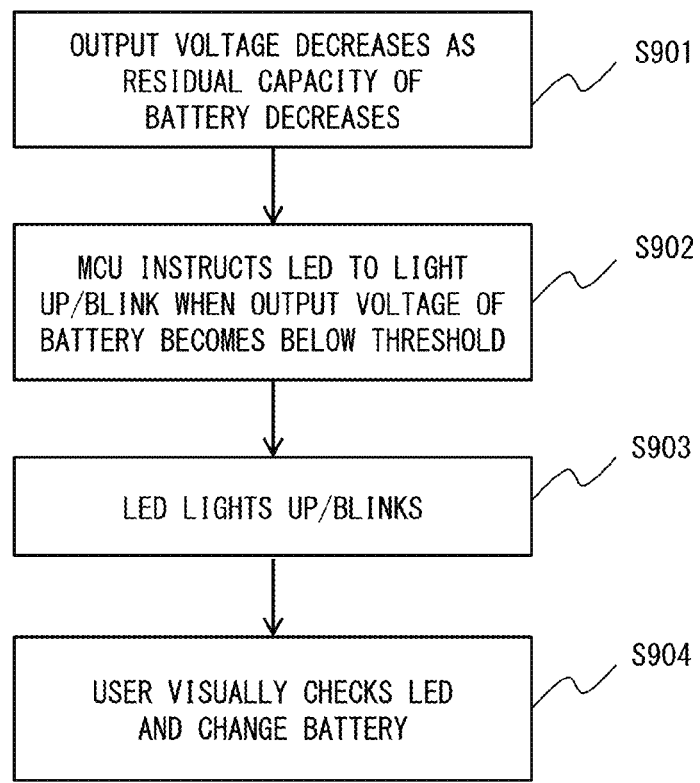
FIG. 15 is a flowchart showing an operation of the short-range wireless device according to the reference example.

FIG. 15 shows an operation of the short-range wireless device 900 according to the reference example. As shown in FIG. 15, the output voltage of the battery 901 decreases as the residual capacity of the battery 901 decreases (S901). The MCU 903 monitors the output voltage of the battery 901 and instructs the LED 902 to light up/blink when the output voltage is below a threshold (S902). The LED 902 is lighted up/blinked according to the instruction from the MCU 902 (S903). The user visually checks whether the LED 902 is lighted up/blinked and changes the battery 901 (S904).

Figure 16:
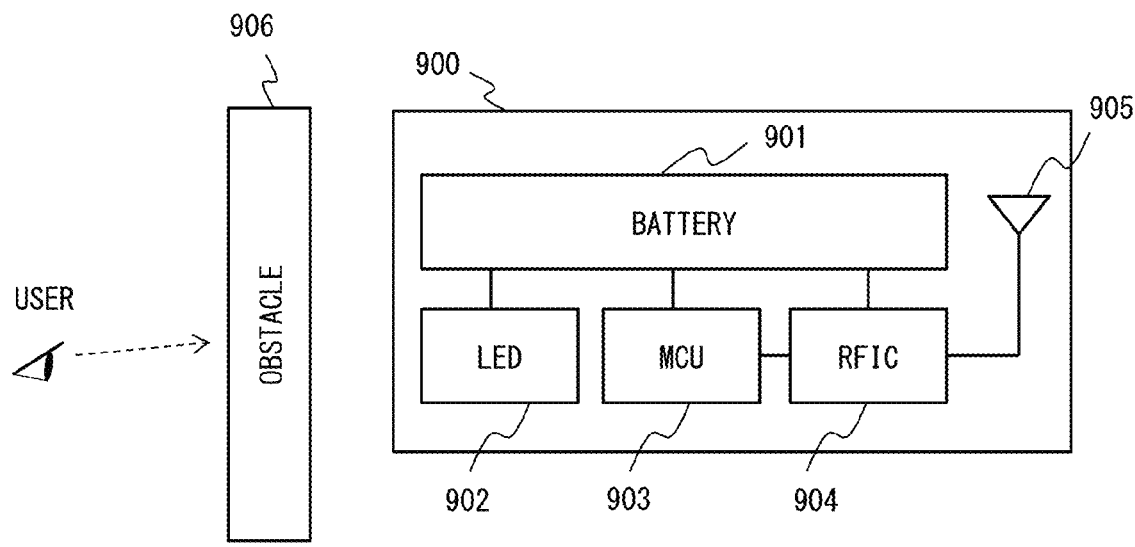
FIG. 16 is a diagram for describing a problem of the short-range wireless device according to the reference example.

The short-range wireless device 900 can be arranged and used in various environments since it performs radio communications. For example, as shown in FIG. 16, there may be an obstacle 906 between the short-range wireless device 900 and the user so that the user cannot see the device. When the short-range wireless device 900 is located so that the user cannot see the device, the user cannot check the LED 902. As a result the user overlooks the changes in the LED 902 and thus cannot find out when it is time to change the battery.

Figure 17:
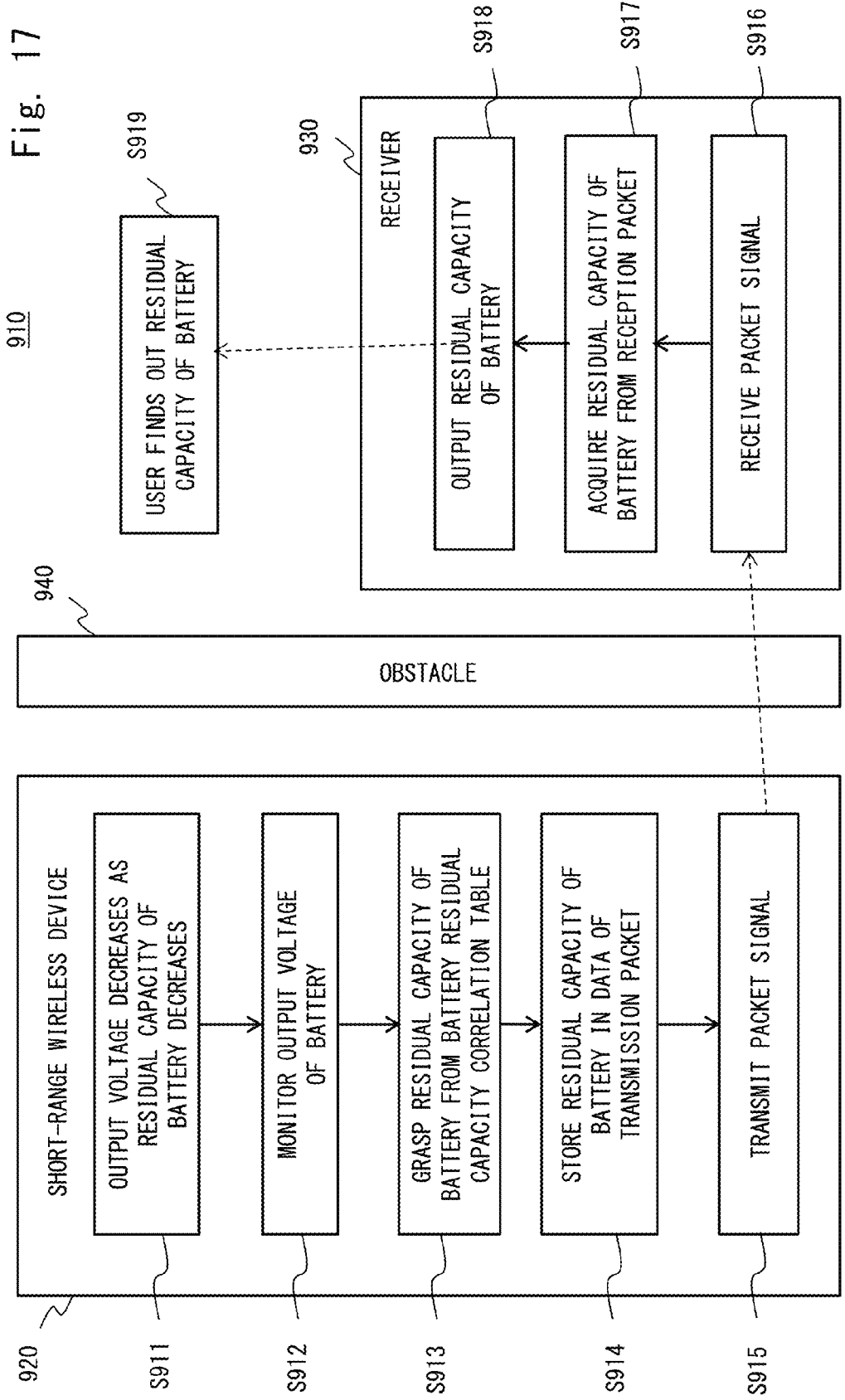
FIG. 17 is a diagram showing a flow of an operation of a radio communication system according to another reference example.

An example in which the residual capacity of a battery is reported to another radio apparatus via a radio communication will now be discussed. FIG. 17 shows an operation of a radio communication system according to another reference example. In a radio communication system 910 according to the reference example, the report on the residual capacity of the battery is transmitted by radio to a receiver 930 from a short-range wireless device 920.

As shown in FIG. 17, in the short-range wireless device 920, the output voltage is reduced due to a decrease in the residual capacity of the battery (S911). The short-range wireless device 920 monitors the output voltage of the battery (S912) and refers to a correlation table in which the residual capacity of the battery and the output voltage stored in advance are associated with each other to find out the residual capacity of the battery (S913). The short-range wireless device 920 stores the residual capacity of the battery in data (payload) of a transmission packet (S914) and transmits a packet signal that stores the residual capacity of the battery to the receiver 930 (S915).

The receiver 930 receives the packet signal from the short-range wireless device 920 (S916) and acquires the residual capacity of the battery from the packet that has been received (S917). The receiver 930 displays and outputs the residual capacity of the battery (S918). Accordingly, even when the user cannot visually recognize the short-range wireless device 920 due to the presence of an obstacle 940, the user can find out the residual capacity of the battery of the short-range wireless device 920 (S919).

As shown in FIG. 17, a method of transmitting by radio data to be communicated that includes the residual capacity of the battery may be considered. However, in order to reduce power consumption, which is the main issue in regard to the recent short-range wireless technology, the operating time of a radio chip (RFIC) needs to be minimized. It is therefore difficult to store value-added data such as data of the residual battery capacity, which is not the essence of the application service, in the transmission packet.

Further, in order to transmit the data of the residual battery capacity by Bluetooth, a connection procedure such as pairing is typically required. In this case, the connection procedure is executed every time the data of the residual battery capacity is transmitted, which causes a waste of power and interrupts power saving.

On the other hand, the Bluetooth LE employs a communication data broadcasting method to save power. One example of the service that uses connectionless broadcasting of Bluetooth LE is an iBeacon (registered trademark) service that provides positional information in a short-distance region.

Figure 18:
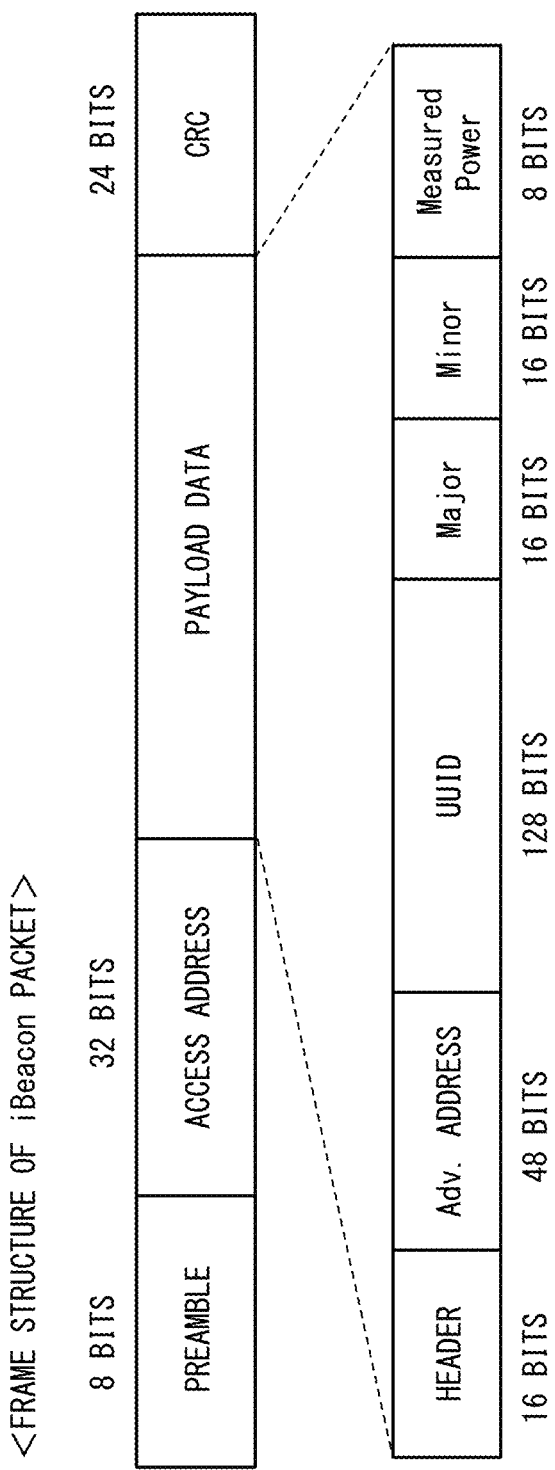
FIG. 18 is a configuration diagram showing a configuration of an iBeacon packet.

FIG. 18 shows a configuration of an iBeacon packet used for the iBeacon service. The iBeacon packet is a connectionless advertising packet that performs connectionless distribution of data required to provide services. As shown in FIG. 18, the iBeacon packet includes a preamble, an access address, payload data, and a CRC (Cyclic Redundancy Check). Further, the payload data in the iBeacon packet includes a header, an Adv address (Advertising address), UUID (128 bits), Major (16 bits), Minor (16 bits), and Measured Power (8 bits).

The short-range wireless device of the transmitter sets an identification ID for UUID, Major, and Minor in the payload data, sets a transmission level value of a position at a distance from the short-range wireless device of 1 m used to calculate the distance for the Measured Power, and transmits the iBeacon frame thus configured.

The receiver identifies the company/organization by UUID, identifies the contents of the services by Major and Minor, and executes the services according to the distance detected by the Measured Power. For example, when the short-range wireless device sets the Measured Power to be −50 dBm and the reception level in the receiver is −50 dBm or larger, it can be detected that the distance between the short-range wireless device and the receiver is within 1 m. Further, since the signal level attenuates by −20 dB for an increment of about 10 m in the distance when the frequency in vacuum freq. is 2.4 GHz, the distance between the short-range wireless device and the receiver can be detected from the difference between the "configuration value −50 dBm" and "the reception level in the receiver".

However, in the iBeacon service, as shown in FIG. 18, the packet size of the iBeacon packet is fixed and there is no area to store other data in the payload data. Therefore, it is impossible to notify the user of the state of the power supply, such as the residual capacity of the battery or the time to change the battery. In the following embodiments, even when the following embodiments are applied to the iBeacon service and the like, the receiver side is able to check the state of the power supply of the transmitter.

(Outline of Embodiments)

Figure 1B:
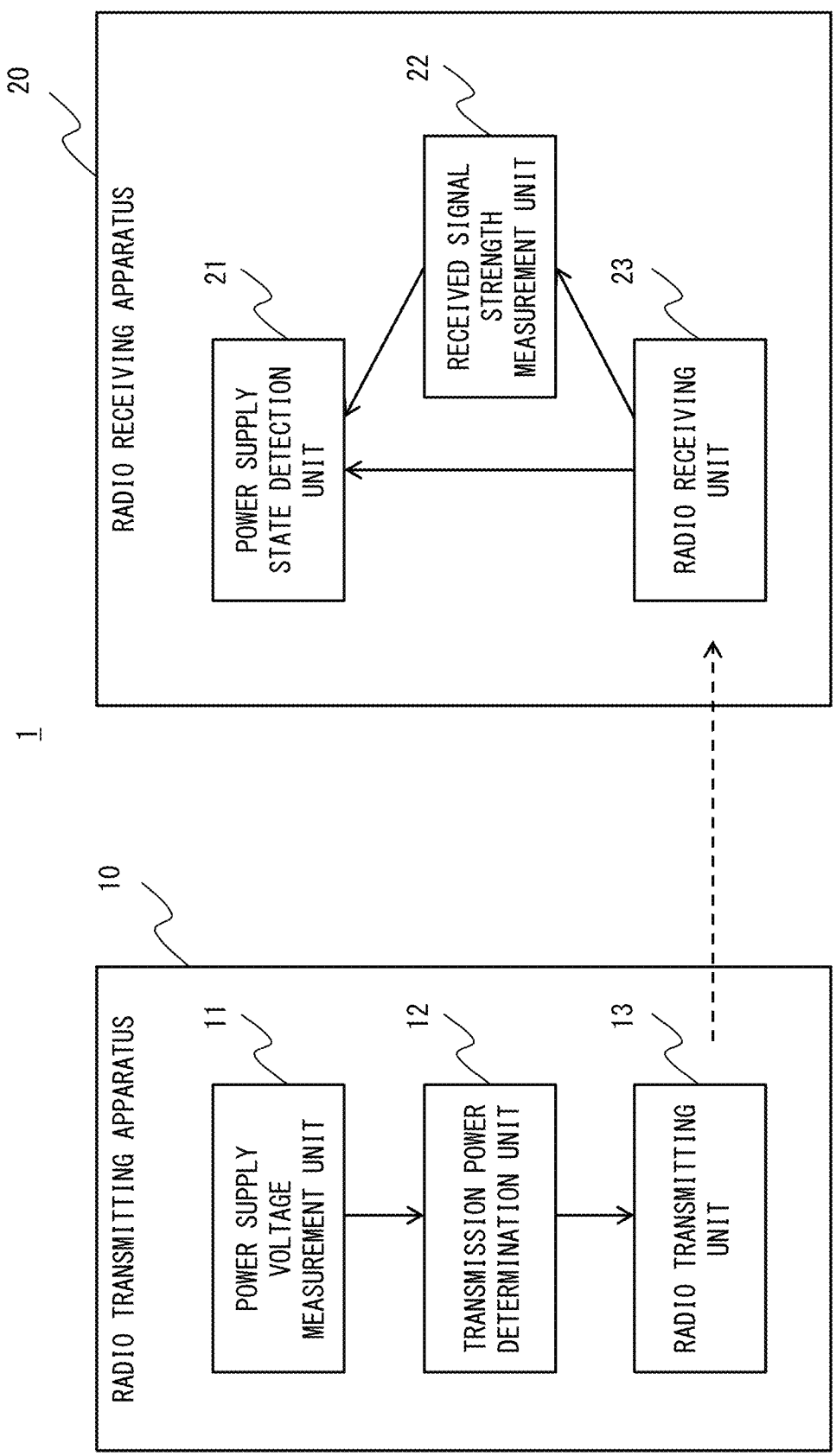
FIG. 1B is a configuration diagram showing one example of the schematic configuration of the radio communication system according to the embodiment.
Figure 1C:
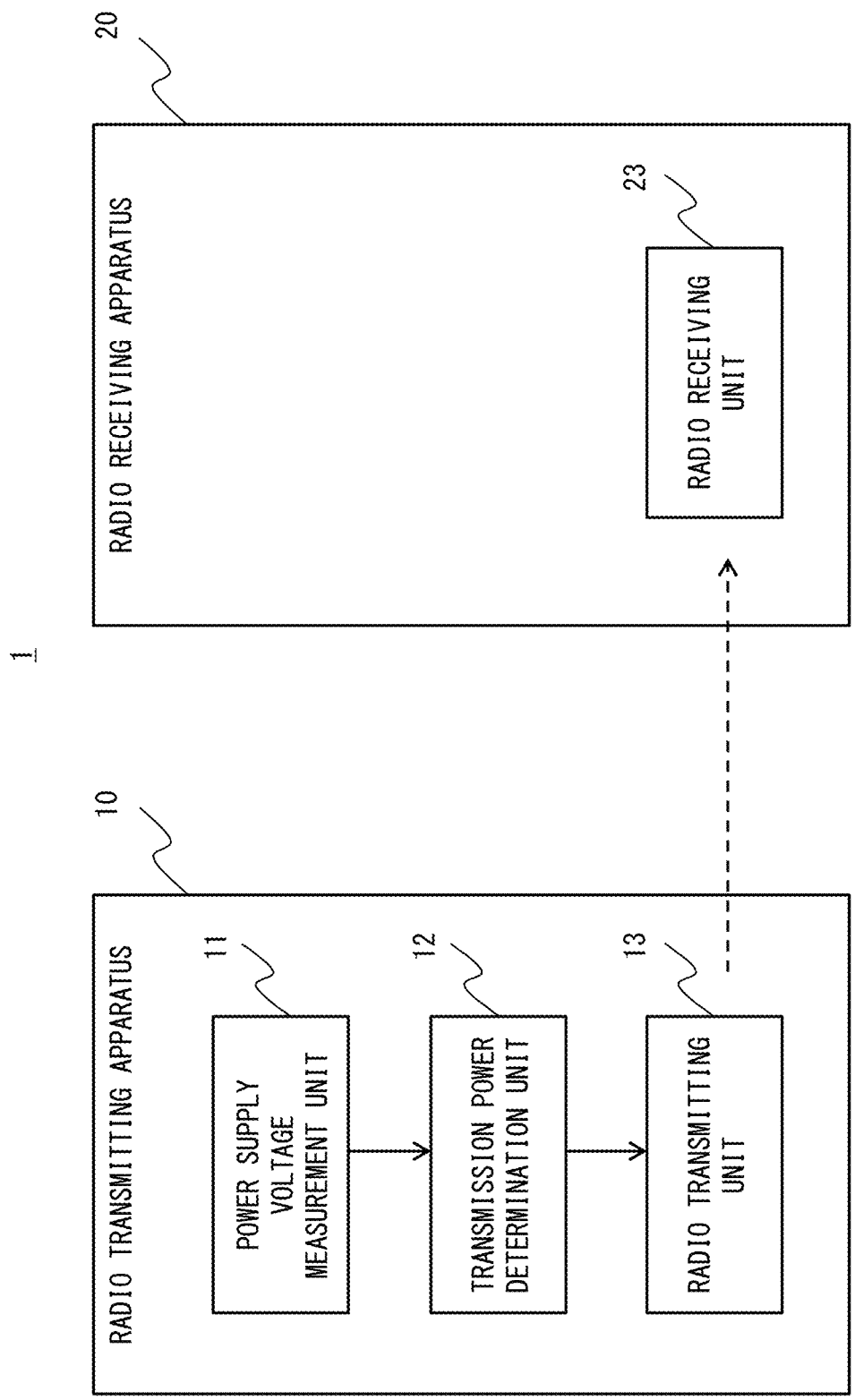
FIG. 1C is a configuration diagram showing one example of the schematic configuration of the radio communication system according to the embodiment.

FIGS. 1A to 1C show outline examples of a radio communication system according to embodiments described later. As shown in FIGS. 1A to 1C, a radio communication system 1 according to the embodiments includes a radio transmitting apparatus 10 that performs radio transmission and a radio receiving apparatus 20 that performs radio reception.

As shown in FIGS. 1A to 1C, the radio transmitting apparatus 10 includes a power supply voltage measurement unit 11, a transmission power determination unit 12, and a radio transmitting unit 13. The power supply voltage measurement unit 11 measures a power supply voltage of the radio transmitting apparatus 10. The transmission power determination unit 12 determines a transmission power based on the power supply voltage measured by the power supply voltage measurement unit 11. The radio transmitting unit 13 transmits by radio an advertisement packet including transmission power information indicating the transmission power determined by the transmission power determination unit 12 based on the transmission power that has been determined. Further, the transmission power determination unit 12 may determine the transmission power based on the result obtained by comparing a predetermined value with a value based on the power supply voltage and the radio transmitting unit 13 may decrease the power to be transmitted based on the transmission power that has been determined.

In the example shown in FIG. 1A, the radio receiving apparatus 20 includes a power supply state detection unit 21 and a radio receiving unit 23. The radio receiving unit 23 receives the advertisement packet transmitted from the radio transmitting apparatus 10. The power supply state detection unit 21 detects the state of the power supply of the radio transmitting apparatus 10 based on the transmission power information included in the advertisement packet. In the example shown in FIG. 1B, the radio receiving apparatus 20 further includes a received signal strength measurement unit 22 that measures a received signal strength of a radio signal including the advertisement packet received by the radio receiving unit 23 and the power supply state detection unit 21 detects the state of the power supply of the radio transmitting apparatus 10 based on the transmission power information included in the advertisement packet and the received signal strength that has been measured. Further, the received signal strength measurement unit 22 may measure the received signal strength of the radio signal that has been received and the power supply state detection unit 21 may detect the state of the power supply of the radio transmitting apparatus 10 based on the result obtained by comparing the predetermined value with the received signal strength that has been measured. In the example shown in FIG. 1C, the radio receiving apparatus 20 includes only the radio receiving unit 23 that receives information on the state of the power supply of the radio transmitting apparatus 10 from the transmission power information included in the advertisement packet.

As stated above, the radio transmitting apparatus transmits the advertisement packet that includes the transmission power information at a transmission power according to the power supply voltage and the radio receiving apparatus detects the state of the power supply of the radio transmitting apparatus based on the transmission power information included in the advertisement packet and the received signal strength. According to this configuration, even when the user cannot visually recognize the radio transmitting apparatus, the user is able to check the state of the power supply, such as the residual capacity of the battery of the radio transmitting apparatus or the time to change the battery. Further, it is possible to notify the user of the state of the power supply without affecting the data of the packet to be transmitted.

First Embodiment

Figure 2:
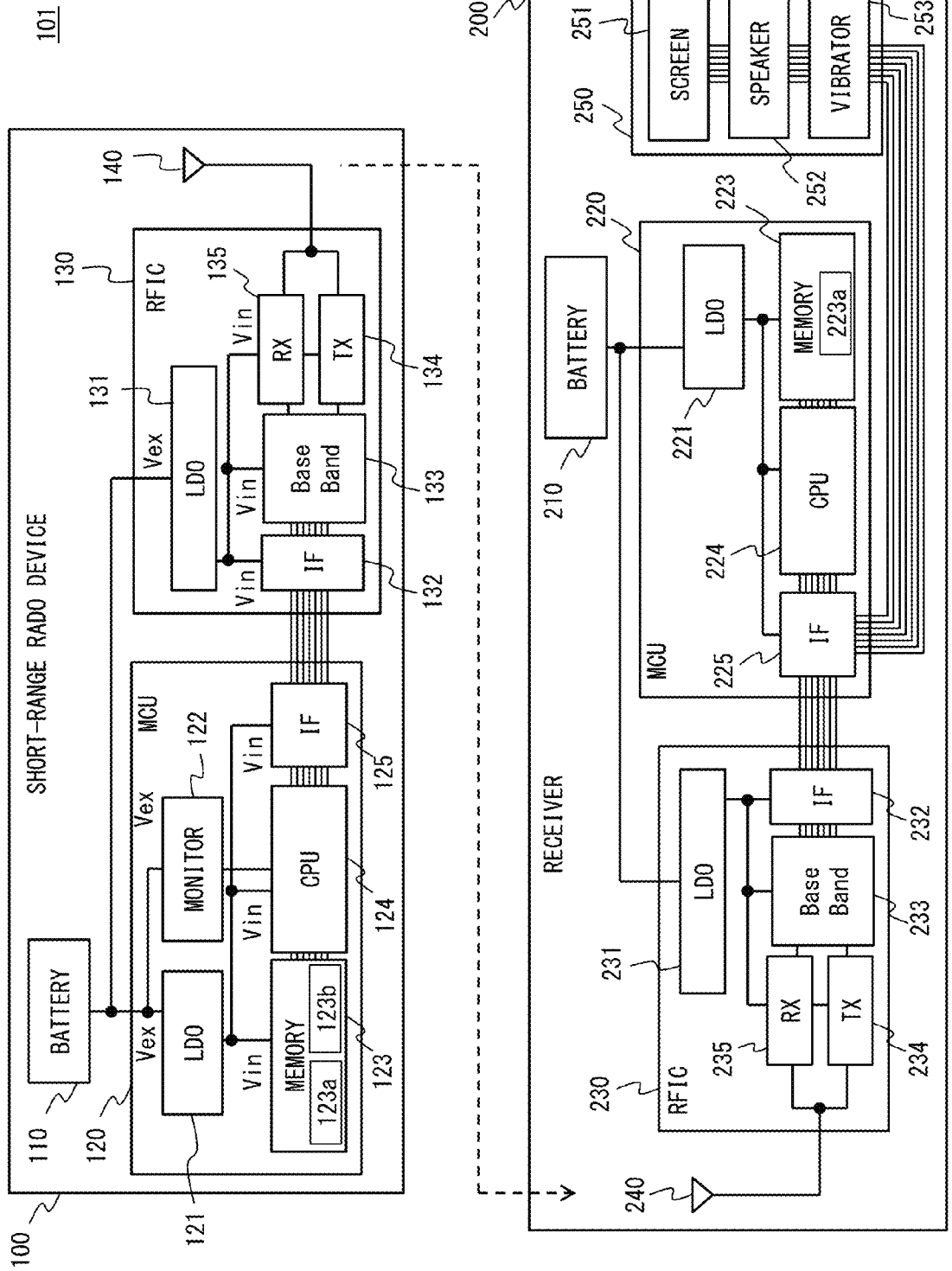
FIG. 2 is a configuration diagram showing a configuration example of a radio communication system according to a first embodiment.

Hereinafter, with reference to the drawings, a first embodiment will be described. FIG. 2 shows a configuration of the radio communication system according to this embodiment. As shown in FIG. 2, a radio communication system 101 according to this embodiment includes a short-range wireless device 100 and a receiver 200.

The short-range wireless device 100 is a radio transmitting apparatus that performs radio transmission to the receiver 200 in compliance with Bluetooth. The short-range wireless device 100 is, for example, a radio sensor and is an iBeacon device that periodically transmits iBeacon packets. The short-range wireless device 100 is in compliance with a wireless standard such as the iBeacon packet in which there are restrictions on the transmission packet length especially for a low power consumption. The short-range wireless device 100 is not limited to the one that is in compliance with Bluetooth and may be another short-range wireless device that operates by a battery.

The short-range wireless device 100 includes a battery 110, an MCU 120, an RFIC 130, and an antenna 140. For example, while the MCU 120 and the RFIC 130 are formed of semiconductor chips different from each other, the MCU 120 and the RFIC 130 may be formed of one semiconductor chip. The short-range wireless device 100 may include various sensors or the like to acquire information that is necessary to provide the iBeacon service.

The battery 110 is a power supply of the short-range wireless device 100 and supplies an output voltage (power supply voltage) Vex to the MCU 120 and the RFIC 130. The MCU (Micro Control Unit) 120 is a controller that executes necessary control processing required for the short-range wireless device 100. The MCU 120 includes an LDO 121, a monitor 122, a memory 123, a CPU 124, and an IF 125.

The LDO (Low Drop Out) 121 is a regulator that generates an internal voltage of the MCU 120. The LDO 121 receives the output voltage Vex (e.g., 1.8 V) of the battery 110, generates an internal voltage Vin (e.g., 1.2V), and supplies the internal voltage Vin to the memory 123, the CPU 124, and the IF 125. The monitor 122 is a power supply voltage measurement unit that monitors (measures) the output voltage (power supply voltage) Vex of the battery 110.

The memory 123 is a storage unit that stores data and programs that are necessary to perform processing of the CPU 124. The memory 123 stores, for example, a battery residual capacity correlation table 123a in which the output voltage and the residual capacity of the battery are associated with each other, a change pattern correlation table (transmission power pattern table) 123b in which the change pattern of the transmission power and the residual capacity of the battery are associated with each other and the like. By referring to the battery residual capacity correlation table 123a and the change pattern correlation table 123b, the transmission power (change pattern) can be determined according to the residual capacity of the battery corresponding to the output voltage that has been measured. The change pattern correlation table 123b may associate the change pattern of the transmission power with the output voltage of the battery and determine the transmission power (change pattern) according to the output voltage that has been measured based on the change pattern correlation table 123b.

The CPU 124 executes control processing based on the data and the program of the memory 123. The CPU 124 is a transmission power determination unit that determines the transmission power for achieving the radio transmission based on the output voltage Vex of the battery 110 measured by the monitor 122. The CPU 124 changes the transmission power every time the iBeacon packet is transmitted according to the decrease of the output voltage Vex. For example, when the output voltage Vex is lower than the threshold corresponding to the time to change the battery, the CPU 124 changes the transmission power of the iBeacon packet. The CPU 124 outputs the transmission power that has been determined and the Measured Power of the iBeacon packet corresponding to the transmission power to the RFIC 130 via the IF 125.

The RFIC 130 is a radio transmitting unit that performs radio transmission according to the Bluetooth standard. In this embodiment, the RFIC 130 transmits the iBeacon packet (beacon packet) including Measured Power (transmission power information) according to an instruction from the MCU 120 at a transmission power (amplitude) according to the instruction from the MCU 120. While the iBeacon packet is one example of the beacon packet, this embodiment may be applied to a packet other than the beacon packet. For example, another advertisement packet that periodically broadcasts predetermined information may be used. The RFIC 130 includes an LDO 131, an IF 132, a baseband 133, a TX (transmission block) 134, and an RX (reception block) 135. Since only the iBeacon service that transmits the iBeacon packet is provided in this embodiment, the RX 135 is not used and only the TX 134 is used in the RFIC 130.

The LDO 131 is a regulator that generates an internal voltage of the RFIC 130. The LDO 131 receives the output voltage Vex (e.g., 1.8 V) of the battery 110, generates an internal voltage Vin (e.g., 1.2 V), and supplies the internal voltage Vin to the IF 132, the baseband 133, the TX 134, and the RX135.

The baseband 133 is a signal processing unit that achieves a communication protocol of Bluetooth and is able to perform communication according to the communication protocol without detailed instructions from the MCU 120. The baseband 133 acquires the transmission power and the Measured Power from the MCU 120 via the IF 132. The baseband 133 outputs the iBeacon packet in which the Measured Power that has been acquired is set to the TX 134 and the TX 134 transmits by radio the iBeacon packet of the transmission power (amplitude) acquired from the MCU 120 via the antenna 140.

The receiver 200 is a radio receiving apparatus that performs radio reception from the short-range wireless device 100 in compliance with Bluetooth. The receiver 200 is, for example, a smartphone, a mobile telephone, or a tablet terminal, and is an iBeacon receiver that regularly receives the iBeacon packet.

The receiver 200 includes a battery 210, which is a power supply, an MCU 220, which is a controller, an RFIC 230, which is a radio receiving unit, an antenna 240, and an output unit 250 that outputs information to the user. The basic configurations of the MCU 220 and the RFIC 230 are similar to those of the MCU 120 and the RFIC 130 of the short-range wireless device 100.

The RFIC 230 includes an LDO 231, an IF 232, a baseband 233, a TX 234, and an RX 235. Since only the iBeacon service that receives iBeacon packets is provided in this embodiment, the TX 234 is not used and only the RX 235 is used in the RFIC 230.

The LDO 231 receives the output voltage of the battery 210, generates an internal voltage, and supplies the internal voltage to the IF 232, the baseband 233, the TX 234, and the RX 235. The RX 235 is a received signal strength measurement unit that measures the received signal strength (RSSI) of the radio signal (iBeacon packet) received via the antenna 240.

The baseband 233 receives the iBeacon packet via the antenna 240 and the RX 235 and acquires the Measured Power included in the iBeacon packet. The baseband 233 outputs the received signal strength and the Measured Power that have been acquired to the MCU 220 via the IF 232.

The MCU 220 includes an LDO 221, a memory 223, a CPU 224, and an IF 225. The LDO 221 receives an output voltage of the battery 210, generates an internal voltage, and supplies the internal voltage to the memory 223, the CPU 224, and the IF 225.

The memory 223 stores, for example, a change pattern correlation table (received signal strength pattern table) 223a in which the change pattern of the received signal strength and the residual capacity of the battery are associated with each other. Due to the presence of the change pattern correlation table 223a, the residual capacity of the battery corresponding to the received signal strength and the Measured Power can be detected. The change pattern correlation table 223a may associate the change pattern of the received signal strength with the power supply voltage and the power supply voltage corresponding to the received signal strength and the Measured Power may be detected based on the change pattern correlation table 223a.

The CPU 224 acquires the Measured Power and the received signal strength of the iBeacon packet from the RFIC 230 via the IF 225. The CPU 224 is a power supply state detection unit that detects the state of the power supply such as the timing to change the battery and the residual capacity of the battery of the short-range wireless device 100 based on the received signal strength and the Measured Power that have been acquired. The CPU 224 detects the decrease in the power supply voltage and the time to change the battery according to the changes of the received signal strength and the Measured Power for each iBeacon packet to be received. The CPU 224 may detect the state of the power supply of the short-range wireless device 100 based on only one of the received signal strength and the Measured Power. The CPU 224 outputs the timing to change the battery and the residual capacity of the battery that have been detected to the output unit 250 via the IF 225.

The output unit 250 includes a screen 251, a speaker 252, and a vibrator (vibration) 253. The screen 251 displays the state of the power supply such as the timing to change the battery, the residual capacity of the battery or the like supplied from the MCU 220. The speaker 252 outputs sound according to the state of the power supply supplied from the MCU 220. The vibrator 253 vibrates according to the state of the power supply supplied from the MCU 220.

Figure 3:
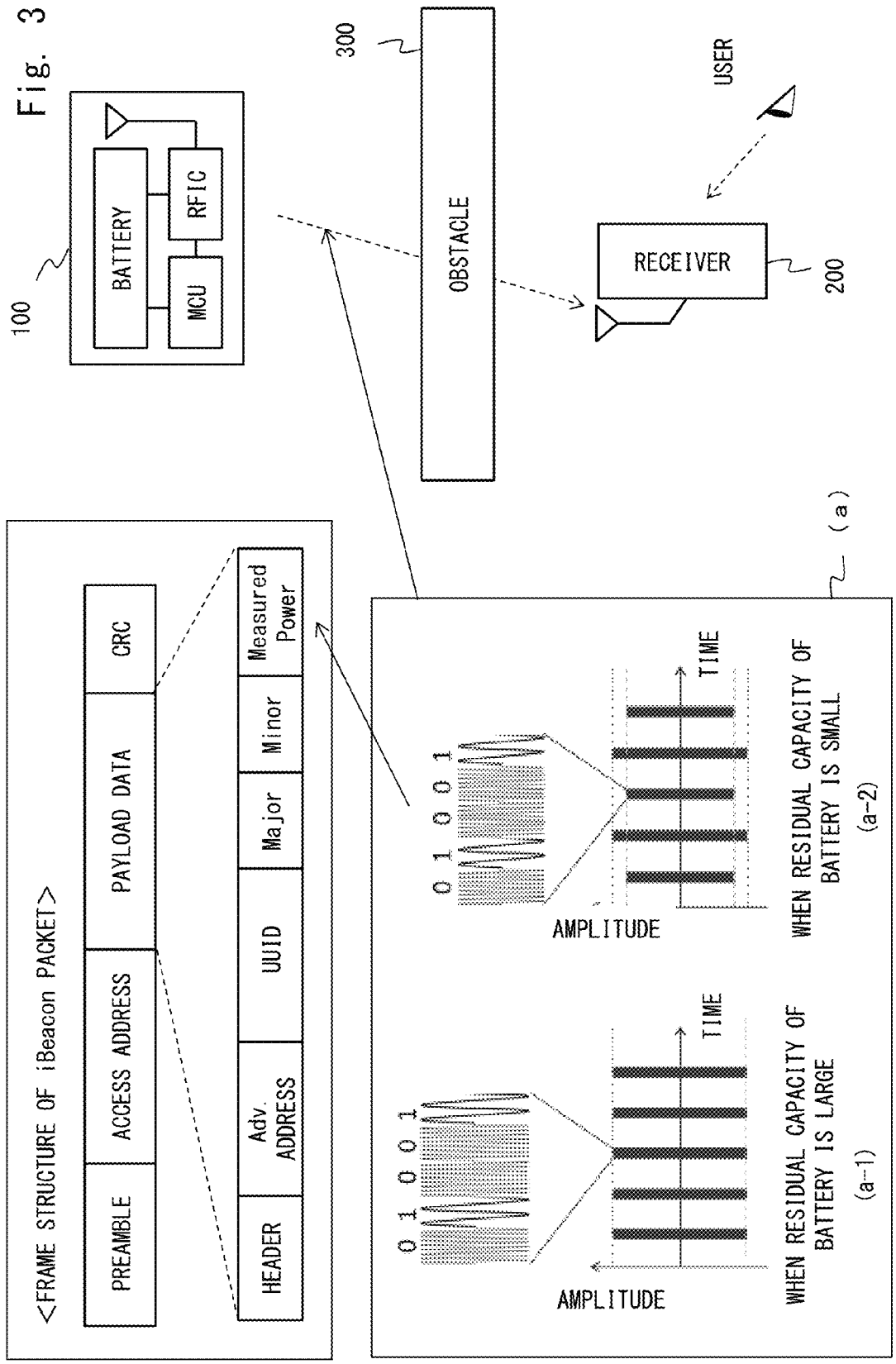
FIG. 3 is a diagram showing an outline of an operation of the radio communication system according to the first embodiment.

FIG. 3 shows an outline of the operation of the radio communication system according to this embodiment. In FIG. 3, an obstacle 300 is present between the short-range wireless device 100 and the user, so the user cannot directly see the short-range wireless device 100.

FIG. 3(a) shows radio signals of the packets (iBeacon) to be sent from the short-range wireless device according to this embodiment to notify the user of the state of the power supply. The iBeacon packet is transmitted at predetermined time intervals. In this example, the radio signals modulated by frequency modulation (FSK) are transmitted in compliance with Bluetooth.

FIG. 3(a) shows an example in which the time to change the battery is sent to the user when the residual capacity of the battery is small. FIG. 3(a-1) shows a radio signal when the residual capacity of the battery is large and FIG. 3(a-2) shows a radio signal when the residual capacity of the battery is small. As shown in FIG. 3(a-1), when the residual capacity of the battery is large, there is no need to change the battery. In this case, the normal operation is performed. The amplitude level (transmission power) of each iBeacon packet is constant.

When the residual capacity of the battery is small as shown in FIG. 3(a-2), the amplitude level (transmission power) of each iBeacon packet is changed in order to notify the user that the battery needs to be changed. In this example, the amplitude level is periodically changed so that the amplitude level becomes large, small, large, small . . . for each iBeacon packet. These changes are recognized as the changes of the reception strength (RSSI), which is a reception parameter of the receiver 200, to detect the time to change the battery and notify the user of the time to change the battery. Even when the amplitude of the radio signal is changed as shown in FIG. 3(a-2), the data in the packet having a frequency modulated does not change, which means that there is no influence on the transmission of the iBeacon packet.

While the example in which the amplitude is changed with respect to the signal of the packet having a frequency modulated (FSK) is described here, another modulation method may be used. For example, the amplitude of the signal of the packet having a phase modulated (PSK) may be changed in a similar way. Further, since the amplitude of the signal of the packet having amplitude modulated (ASK) changes in the packet, the amplitude maximum value or the average value may be changed.

Further, in this embodiment, the Measured Power in each iBeacon packet is also changed in synchronization with the changes of the amplitude (transmission power) of each iBeacon packet. Another packet (e.g., fixed-length packet) including the transmission power information may be used in place of the iBeacon packet.

In the short-range wireless device 100, after the data in the iBeacon packet is generated/processed by the MCU 120, the frequency is converted into a frequency between a baseband frequency (near 0 Hz) and a high frequency (several GHz) in the next RFIC 130, and the data is sent from the antenna 140.

The parts of the iBeacon packet in which the user can change the information are UUID, Major, Minor, and Measured Power in the payload data. A method of notifying the user of the residual capacity of the battery using them will be discussed. Since UUID is the service identification ID, data in UUID cannot be changed depending on the amount of the residual capacity of the battery. Further, changes in the data in Major and Minor greatly affect the whole system, which is not realistic.

On the other hand, the Measured Power (8 bits) stores the value indicating the transmission power configuration level and the distance between the short-range wireless device (transmitter) and the receiver is calculated from the spatial loss using the difference between the Measured Power value and the reception strength (RSSI) in the receiver side as a parameter. Even when the data in the Measured Power is slightly changed, a differential parameter does not change as long as the spatial loss does not change. Accordingly, in this embodiment, when the residual capacity of the battery becomes small, the transmission power and the Measured Power are periodically changed in association with each other, whereby the data can be sent to the receiver with a data accuracy of 8 bits of the Measured Power value.

In the short-range wireless device 100, the RFIC 130 changes the transmission level strength of the packet signal. Since the RFIC typically includes a function of adjusting the output level, there is no need to make another circuit correction to add the function of adjusting the output level to achieve this embodiment.

Consider a case in which the transmission level control in the RFIC is smaller than 8 bits while the Measured Power of the iBeacon packet is 8 bits, that is, for example, while the Measured Power has a resolution of 0.1 dB step of the transmission level, the transmission level can be changed only by 1 dB step in the analog circuit of the RFIC. In this case, when the resolution of the Measured Power can be regarded as an error for the analog signal, the configuration of the transmission level of the RFIC is not changed and only the Measured Power is changed.

Figure 4:
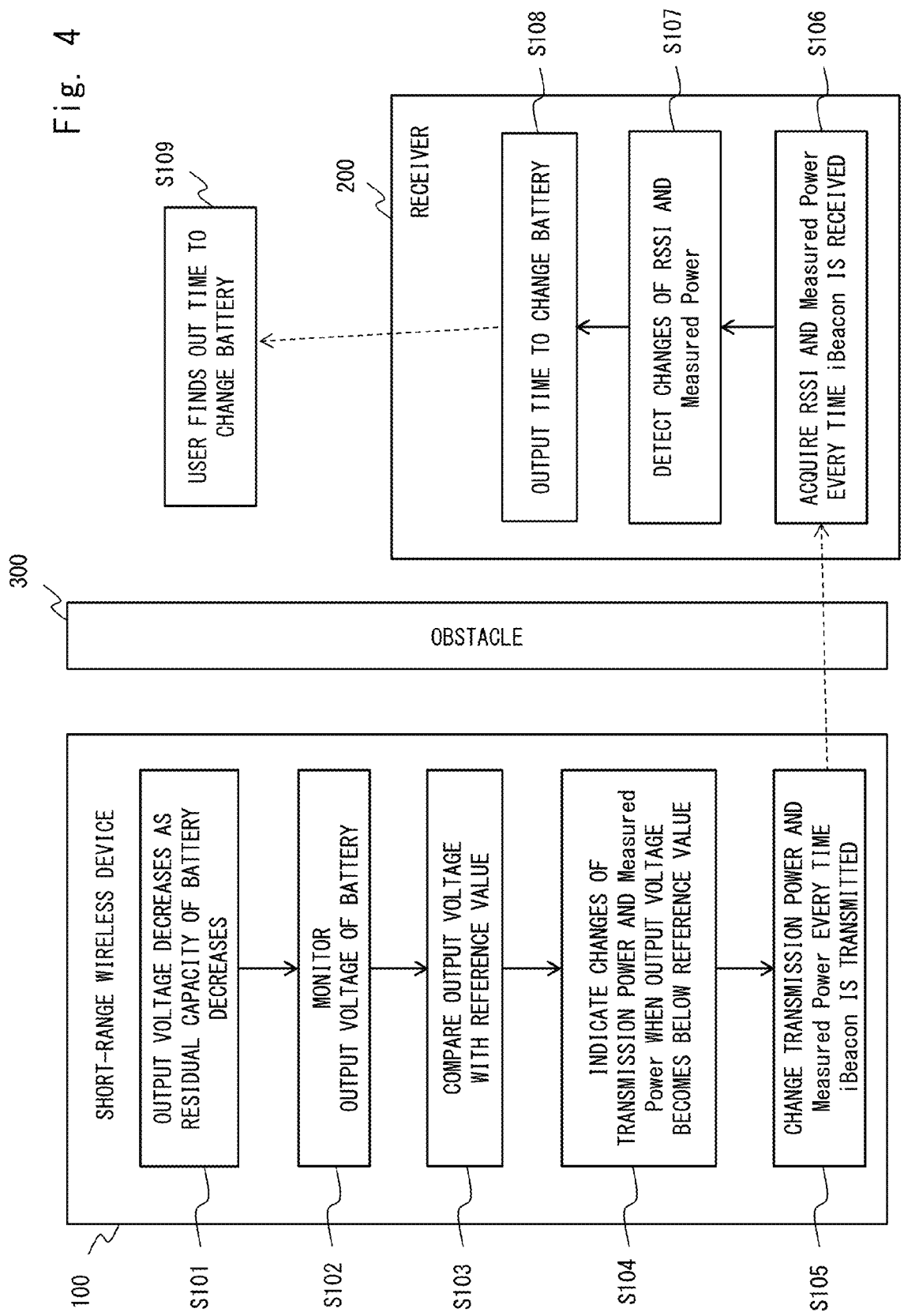
FIG. 4 is a diagram showing one example of a flow of an operation of the radio communication system according to the first embodiment.

FIG. 4 shows one example of the operation of the radio communication system according to this embodiment. This example is an example of notifying the user of whether to change/not to change the battery (time to change the battery).

First, the output voltage of the battery 110 is reduced since the residual capacity of the battery 110 decreases (S101). The monitor 122 monitors the output voltage of the battery 110 (S102) and transmits the output voltage to the CPU 124.

Figure 5:
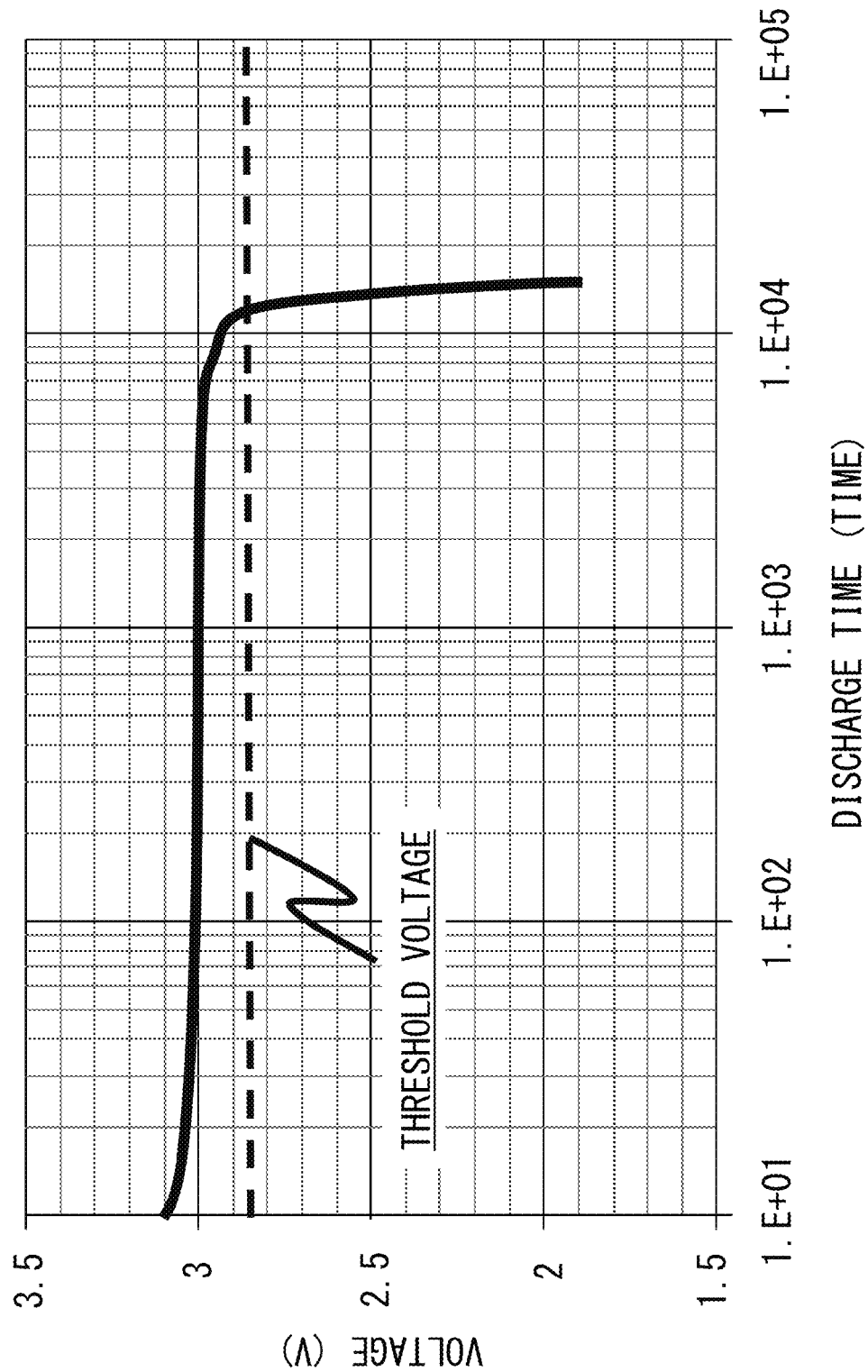
FIG. 5 is a diagram showing one example of a threshold used in the radio communication system according to the first embodiment.

Next, the CPU 124 compares the output voltage of the battery 110 that has been sent with the reference value (threshold) (S103). Since this threshold is a standard to notify the user of the time to change the battery, it is equal to or larger than the voltage at which packets for notification can be sent. FIG. 5 shows an example of the discharge characteristics and the threshold voltage of a coin battery (CR 2032). For example, when the discharge characteristics are as shown in FIG. 5, the normal voltage is 3.0 V and the threshold voltage is 2.85 V (about 95%).

Next, when the output voltage of the battery 110 becomes below the reference value as the result of the comparison, the CPU 124 indicates changes of the transmission power and the Measured Power to notify the user of the time to change the battery (S104). In this example, the instruction to change the transmission power of TX and the instruction to change the Measured Power value of the iBeacon packet according to the change in the transmission power are output to the RFIC 130. The RFIC 130 changes the Measured Power of the iBeacon packet according to these instructions and changes the transmission power to transmit the iBeacon packet from the TX (transmission block) (S105).

Figure 6:
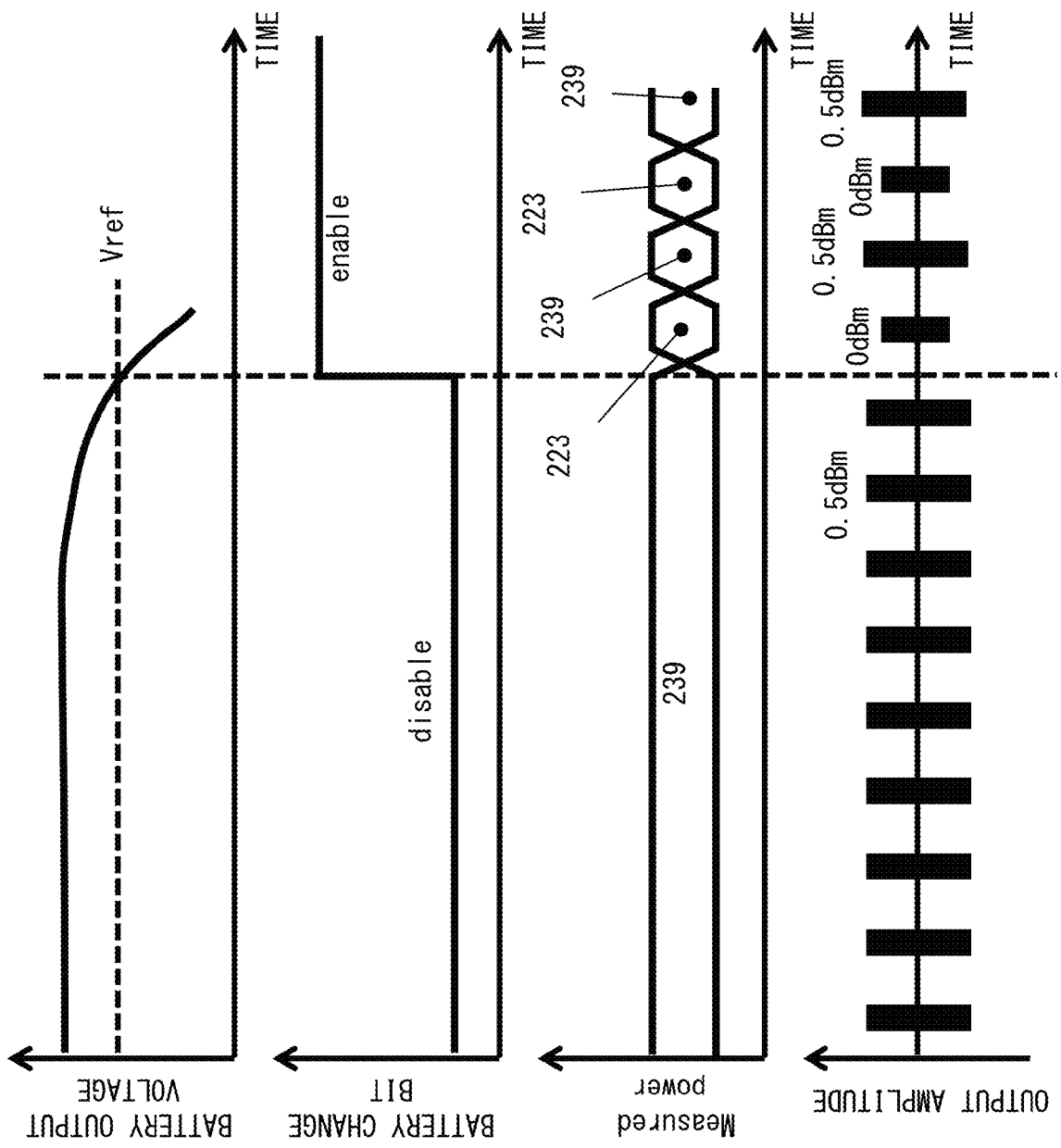
FIGS. 6(a)-6(d) are diagrams showing one example of signals used in the radio communication system according to the first embodiment.

For example, as shown in FIG. 6, when the output voltage of the battery 110 becomes lower than the reference value (Vref) (FIG. 6(a)), the CPU 124 changes the battery change bit from disable to enable (FIG. 6(b)). The battery change bit is a control bit inside the CPU 124. When the battery change bit becomes enable, the CPU 124 controls the RFIC 130 to periodically change the transmission power (output amplitude) (FIG. 6(d)) and changes, at the same time, the Measured Power in the iBeacon packet in association with the transmission power (FIG. 6(c)).

Figure 7:
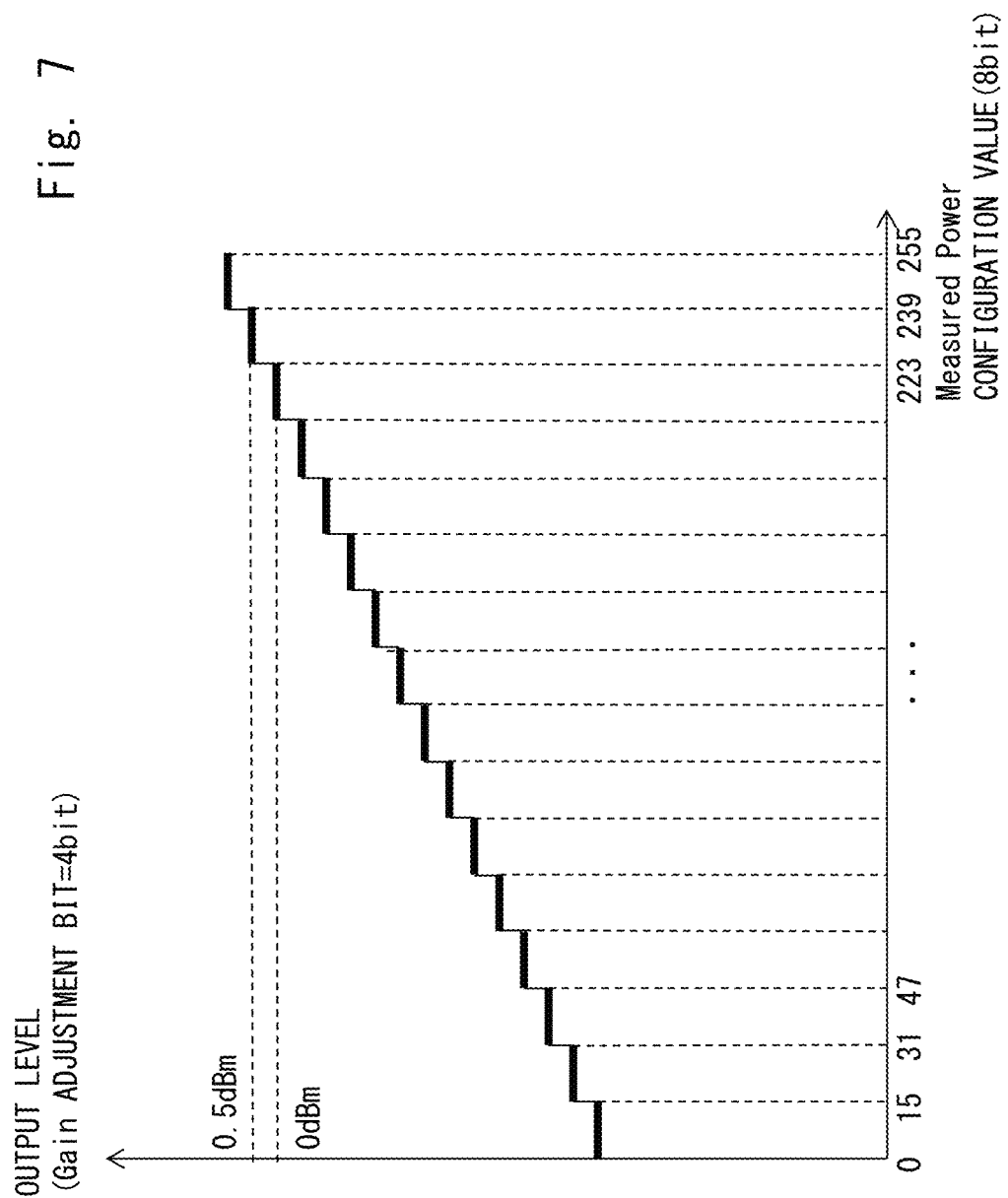
FIG. 7 is a diagram showing one example of Measured Power used in the radio communication system according to the first embodiment.

It is assumed, for example, as shown in FIG. 7, that four bits of the Measured Power are gain adjustment bits of the transmission power and the transmission power increases by 0.5 dBm for each bit. When the output amplitude is set to repeat 0 dBm and 0.5 dBm to notify the user of the time to change the battery, the Measured Power of the iBeacon packet is set to repeat 223 and 239 corresponding to the output amplitude since 0 dBm corresponds to the Measured Power value 223 and 0.5 dBm corresponds to the Measured Power value 239.

On the other hand, in the receiver 200, the RFIC 230 receives the iBeacon packet in the RX (reception block) and acquires the signal strength (RSSI) and the Measured Power of the iBeacon packet that has been received (S106). Further, the RX of the RFIC 230 adjusts the Gain configuration of the reception block corresponding to the received signal level (RSSI) as a general reception block operation.

Next, the CPU 224 detects the changes of the RSSI value and the Measured Power value of the iBeacon packet and detects the battery needs to be changed (time to change the battery) (S107). The CPU 224 stores the RSSI value and the Measured Power value for each iBeacon packet in the memory 123 and compares each RSSI value and the Measured Power value to detect the changes (change patterns). For example, when the RSSI value and the Measured Power value periodically change as shown in FIGS. 6(c) and 6(d), it is detected that the change of the battery is required. For example, the time to change the battery may be detected based on the result of comparing a predetermined threshold with one or both of the RSSI value and the Measured Power value.

Next, the output unit 250 notifies the user that the change of the battery is necessary (time to change the battery) (S108). For example, the user is notified of the time to change the battery by the display on the screen 251, the alarm sound from the speaker 252, vibrations by the vibrator 253 or the like. The user is therefore able to find out the time to change the battery (S109).

Figure 8:
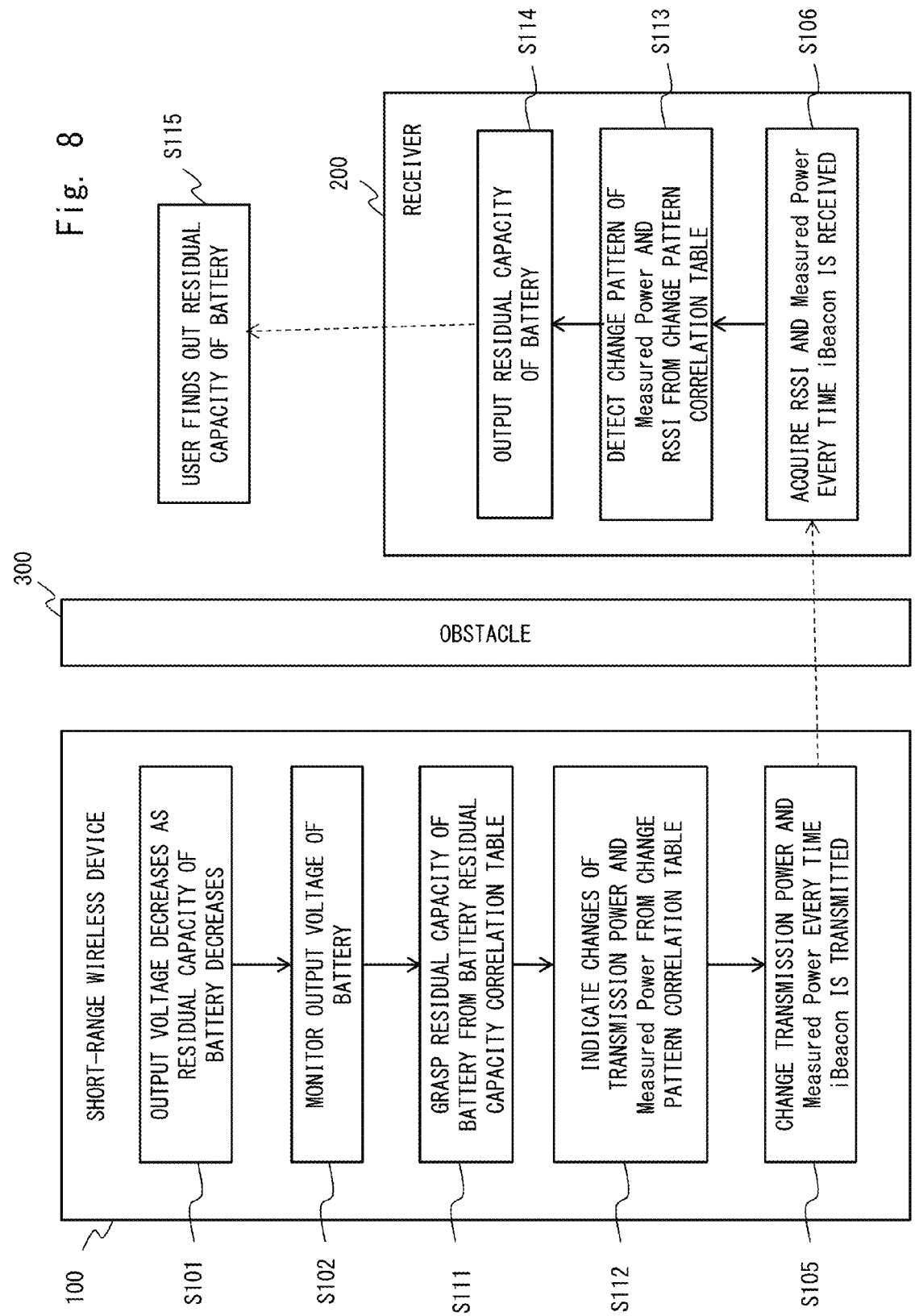
FIG. 8 is a diagram showing another example of the flow of the operation of the radio communication system according to the first embodiment.

FIG. 8 shows another example of the operation of the radio communication system according to this embodiment.

In this example, the residual capacity of the battery is sent in a plurality of stages (e.g., residual capacity 50%, 30%, 20%, 10%, etc.)

First, similar to the processing in FIG. 4, the output voltage of the battery 110 decreases since the residual capacity of the battery 110 decreases (S101) and the monitor 122 monitors the output voltage of the battery 110 (S102).

Next, the CPU 124 refers to the battery residual capacity correlation table 123a in which the output voltage of the memory 123 and the residual capacity of the battery are associated with each other to find out the residual capacity of the battery of the battery 110 based on the output voltage that has been monitored (S111). Further, the CPU 124 refers to the change pattern correlation table 123b of the residual capacity of the battery of the memory 123 and the transmission power to instruct the RFIC 130 to change the transmission power and the Measured Power (change pattern) based on the residual capacity of the battery (S112). The RFIC 130 changes the Measured Power value and the transmission power of the iBeacon packet according to the instruction (S105).

Figure 9:
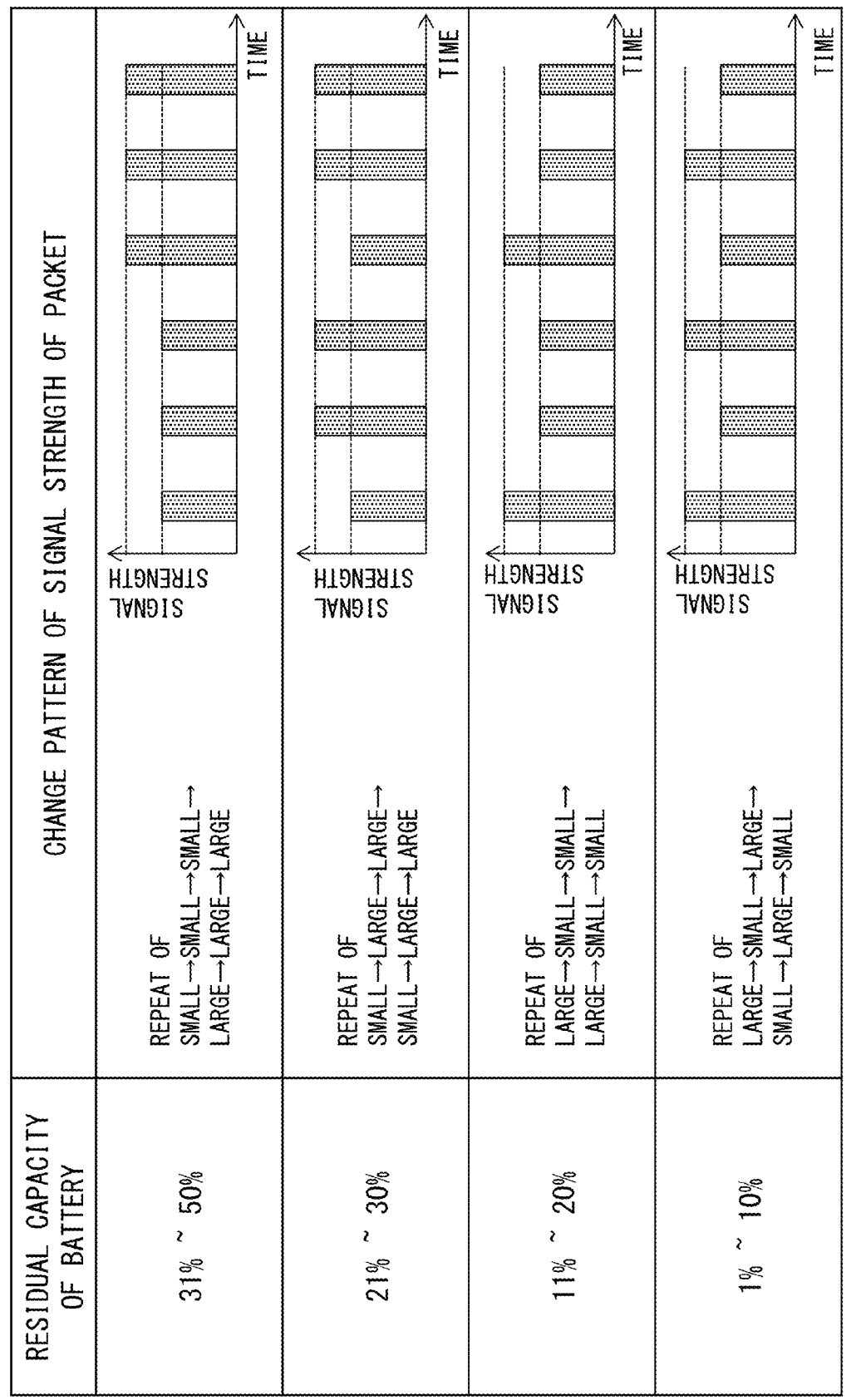
FIG. 9 is a diagram showing one example of signal patterns used in the radio communication system according to the first embodiment.

FIG. 9 shows an example of the change patterns of the signal strength (transmission power) of the packet. In this example, the pattern of the transmission power corresponding to the residual capacity of the battery is periodically repeated. As shown in FIG. 9, when the residual capacity of the battery is from 31% to 50%, the signal strength is repeated in the pattern of small, small, small, large, large, large. When the residual capacity of the battery is from 21% to 30%, the signal strength is repeated in the pattern of small, large, large, small, large, large. When the residual capacity of the battery is from 11% to 20%, the signal strength is repeated in the pattern of large, small, small, large, small, small. When the residual capacity of the battery is from 1% to 10%, the signal strength is repeated in the pattern of large, small, large, small, large, small. Further, when the residual capacity of the battery is 51% or larger, the signal strength is made constant.

On the other hand, in the receiver 200, similar to that shown in FIG. 4, the RFIC 230 acquires the Measured Power and the signal strength (RSSI) of the iBeacon packet that has been received (S106).

Next, the CPU 224 refers to the change pattern correlation table 223a of the residual capacity of the battery of the memory 223 and the reception strength, detects the change pattern of the RSSI value and the Measured Power value of the iBeacon packet, and detects the residual capacity of the battery corresponding to the change pattern (S113). For example, when the RSSI value and the Measured Power value are periodically changed as shown in FIG. 9, the residual capacity of the battery corresponding to the change pattern is detected.

Next, the output unit 250 notifies the user of the residual capacity of the battery that has been detected (S114). For example, the user is notified of the residual capacity of the battery by the display on the screen 251, the alarm sound from the speaker 252, the vibrations by the vibrator 253 or the like. The user is therefore able to find out the residual capacity of the battery (S115).

As stated above, in this embodiment, the transmitter transmits the whole characteristics of the transmission packet (the average value or the Max value of the transmission level) including information on the residual capacity of the battery without changing the data in the transmission packet and the receiver compares the characteristics for each packet that is sent at regular time intervals to receive the data of the residual capacity of the battery.

If the time to change the battery is indicated by the LED that is lighted up/blinked like the related art, the user cannot easily find the notification when the device is located in a place that cannot easily seen by the user. Since the information on the state of the power supply is transmitted as radio data in this embodiment, even when the user cannot directly see the short-range wireless device, it is possible to notify the user of the information on the state of the power supply. Further, as there is no need to add the information on the state of the power supply to original data included in the transmission packet, the transmission time does not increase and power consumption does not increase.

Further, in this embodiment, the iBeacon packet to provide the iBeacon service is transmitted and the Measured Power of the iBeacon packet is changed in a way similar to the transmission power of the packet. It is therefore possible to notify the user of the state of the power supply while suppressing an influence on the information to be included in the iBeacon packet (payload). Further, since the data indicating the state of the power supply can be received based on the RSSI and the Measured Power of the reception packet, the user can be notified of the state of the power supply with high accuracy. Since the state of the power supply is read out from digital information which is the Measured Power value, it is possible to send periodic changes of the transmission power to the receiver side even when there is only a slight change in the transmission power.

Second Embodiment

Hereinafter, with reference to the drawings, a second embodiment will be described. The configuration of the radio communication system according to this embodiment is similar to that of the first embodiment. Further, the example in which the transmission power (amplitude level) is changed according to the state of the power supply and the Measured Power value is not changed will be described in this embodiment, similar to the first embodiment. Since the Measured Power is not used in this embodiment, packets other than the iBeacon packet may be transmitted.

Figure 10:
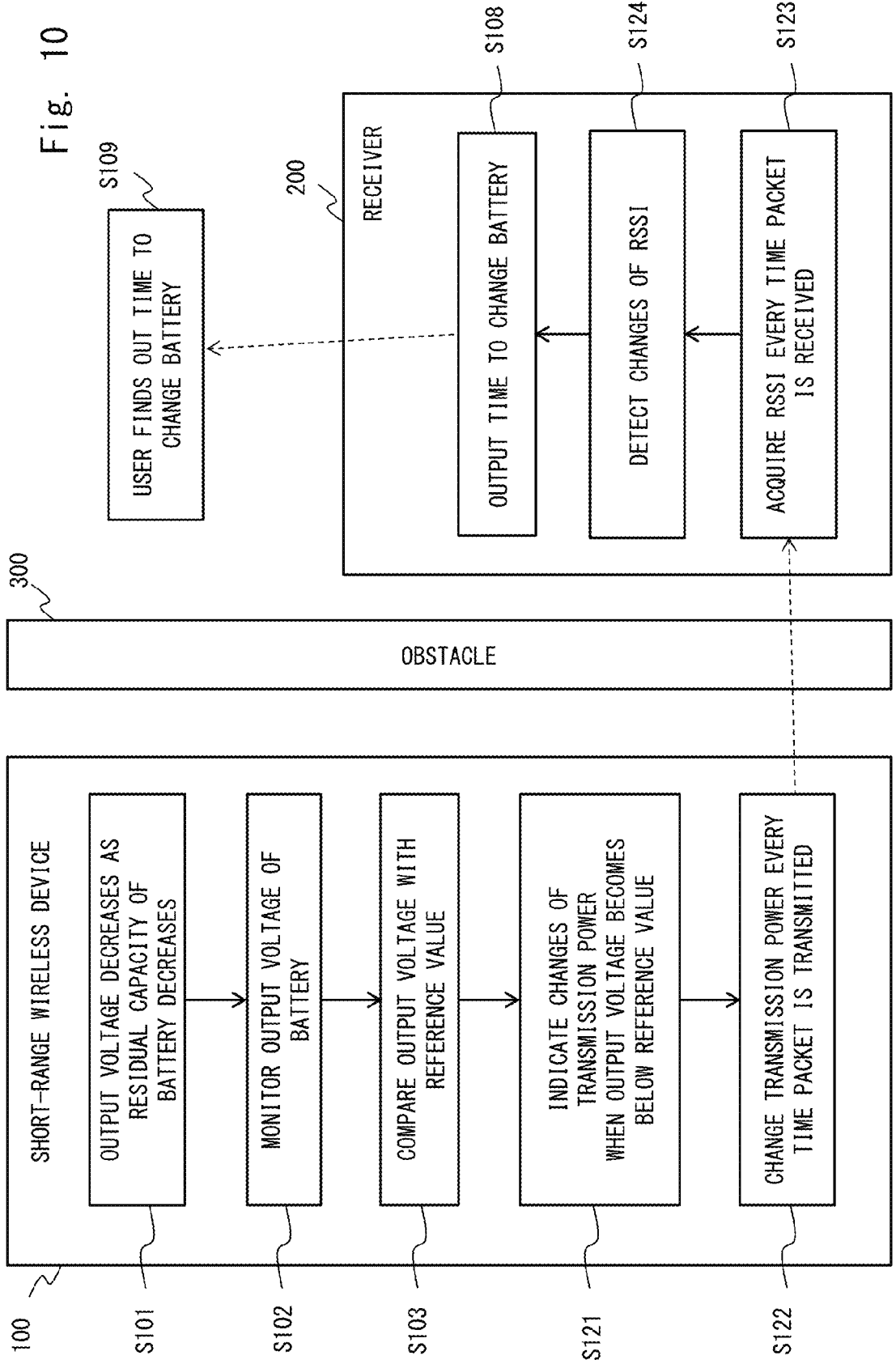
FIG. 10 is a diagram showing one example of a flow of an operation of a radio communication system according to a second embodiment.

FIG. 10 shows one example of the operation of the radio communication system according to this embodiment. This example is an example of notifying the user of information regarding whether the change of the battery is required/not required, similar to FIG. 4 according to the first embodiment.

First, similar to FIG. 4, the output voltage of the battery 110 decreases since the residual capacity of the battery 110 decreases (S101), the monitor 122 monitors the output voltage of the battery 110 (S102), and the CPU 124 compares the output voltage of the battery 110 with the reference value (S103).

Next, when the output voltage of the battery 110 is below the reference value as the result of the comparison, the CPU 124 instructs changes of the transmission power (S121). In this example, the CPU 124 outputs only the instruction to change the TX transmission power to the RFIC 130. The RFIC 130 changes the transmission power according to this instruction and transmits packets from the transmission block (TX) (S122).

In the receiver 200, the RFIC 230 receives the packet in the reception block (RX) and acquires the signal strength (RSSI) of the packet that has been received (S123). Further, the RFIC 230 acquires necessary data from the packet that has been received.

Next, the CPU 224 detects the changes of the RSSI value of the packet that has been received and detects that the battery needs to be changed (time to change the battery) (S124). Further, the output unit 250 notifies the user that the battery needs to be changed (time to change the battery) (S108) and the user is able to find out the time to change the battery (S109). Similar to FIG. 8 according to the first embodiment, the residual capacity of the battery may be sent in a plurality of stages.

As described above, while the Measured Power is not used in this embodiment, information on the state of the power supply is transmitted by changing the transmission power (amplitude) of the packet, similar to the first embodiment. Accordingly, even when the user cannot directly see the short-range wireless device, the user can get the information on the state of the power supply. Further, there is no influence on the data of the transmission packet.

(Varied Example 1 of Embodiment)

Figure 11:
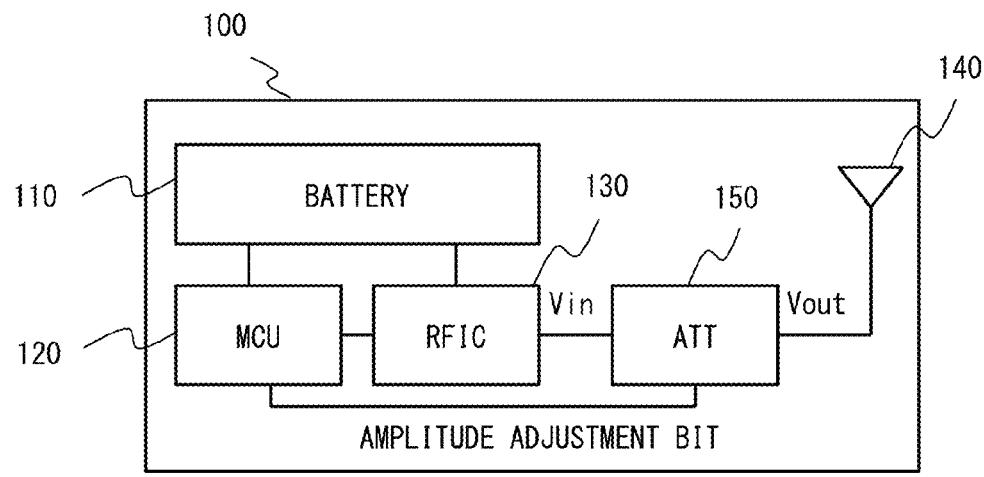
FIG. 11 is a configuration diagram showing a configuration example of a short-range wireless device according to a varied example of the embodiment.

As described in the above embodiments, the control of the amplitude corresponding to the state of the power supply may be performed by the RFIC or another configuration. For example, as shown in FIG. 11, an attenuator for adjusting the amplitude may be arranged at the stage next to the RFIC. Alternatively, the attenuator may be arranged inside the RFIC.

The short-range wireless device 100 according to the varied example includes, besides the configurations described in the first or second embodiment, an attenuator (ATT) 150. The attenuator 150 is connected between the RFIC 130 and the antenna 140 and receives an amplitude adjustment bit that adjusts the amplitude from the MCU 120. The attenuator 150 adjusts the amplitude level of the voltage Vin that has been input according to the amplitude adjustment bit from the MCU 120 and outputs the voltage Vout whose amplitude has been adjusted.

Figure 12:
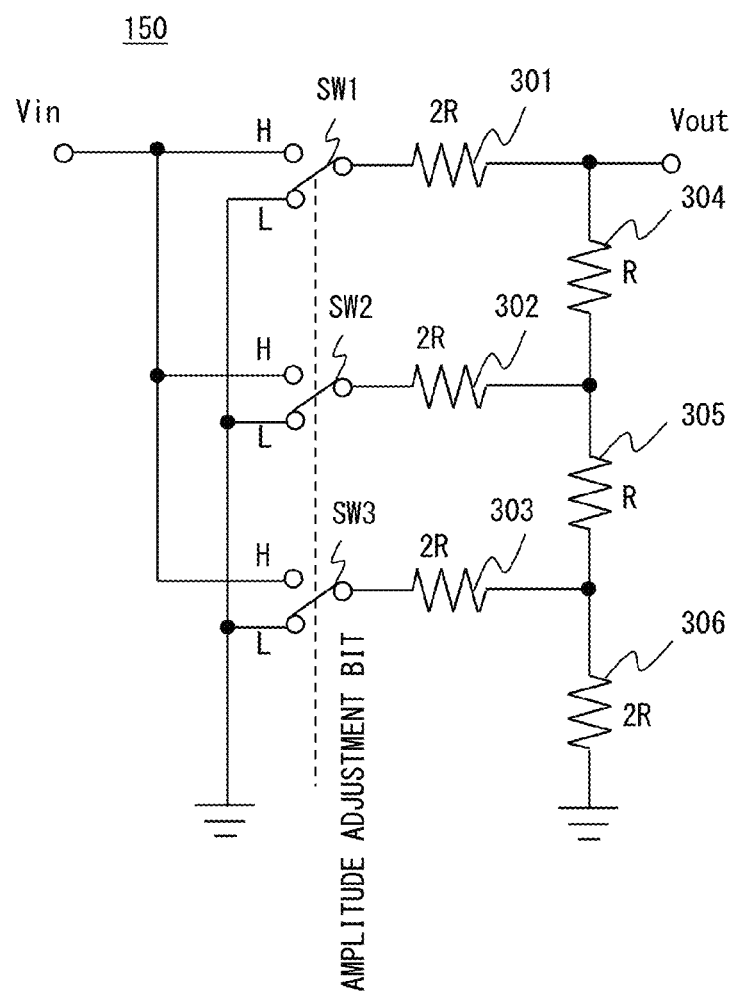
FIG. 12 is a circuit diagram showing a configuration example of an attenuator according to the varied example of the embodiment.

FIG. 12 shows a circuit configuration example of the attenuator according to this embodiment and FIG. 13 shows an example in which the output voltage of the attenuator is switched.

As shown in FIG. 12, the attenuator 150 includes resistors 301 to 306 and switches SW1 to SW3. The switches SW1 to SW3 are connected in parallel to the input terminal of a voltage Vin. The resistor 304 having a resistance value R, the resistor 305 having a resistance value R, and the resistor 306 having a resistance value 2R are connected in series between the output terminal of a voltage Vout and the GND.

The resistor 301 having a resistance value 2R is connected between the switch SW1 and the output terminal of the voltage Vout, the resistor 302 having a resistance value 2R is connected between the switch SW2 and the intermediate node of the resistor 304 and the resistor 305, and the resistor 303 having a resistance value 2R is connected between the switch SW3 and the intermediate node of the resistor 305 and the resistor 306.

The switch SW1 switches the connection between one end of the resistor 301 and the input terminal or the GND according to H/L of the amplitude adjustment bit, the switch SW2 switches the connection between one end of the resistor 302 and the input terminal or the GND according to H/L of the amplitude adjustment bit, and the switch SW3 switches the connection between one end of the resistor 303 and the input terminal or the GND according to H/L of the amplitude adjustment bit.

As shown in FIG. 13, when the switch SW1 is denoted by H, the switch SW2 is denoted by L, and the switch SW3 is denoted by L, one end of the resistor 301 is connected to the input terminal and one end of each of the resistors 302 and 303 is connected to the GND, whereby Vout=½*Vin is established. When the switch SW1 is denoted by L, the switch SW2 is denoted by H, and the switch SW3 is denoted by L, one end of the resistor 302 is connected to the input terminal and one end of each of the resistors 301 and 303 is connected to the GND, whereby Vout=¼*Vin is established. When the switch SW1 is denoted by L, the switch SW2 is denoted by L, and the switch SW3 is denoted by H, one end of the resistor 303 is connected to the input terminal and one end of each of the resistors 301 and 302 is connected to the GND, whereby Vout=⅛*Vin is established. According to the simple circuit configuration as shown in FIG. 12, the amplitude can be adjusted by three stages as shown in FIG. 13.

(Varied Example 2 of Embodiment)

While the short-range wireless device overlaps the battery information on the transmission signal in the above embodiment, an LED may be included in the short-range wireless device and the LED may be blinked/lighted up.

That is, when the battery needs to be changed in the short-range wireless device according to the first and second embodiments, the transmission level of the transmission signal is regularly changed and the LED is blinked/lighted up. When the transmission packet is the iBeacon packet, the Measured Power value in the packet is also changed regularly. When the user is able to visually see the short-range wireless device, the user is able to visually check the LED that is blinking/lighting up and then change the battery.

Further, similar to the first and second embodiments, the receiver (mobile terminal) emits the alarm sound or vibrates by the vibrator according to the changes of the RSSI value and the Measured Power value. The user is therefore able to acquire the information regarding the change of the battery from the receiver even when the user cannot visually see the short-range wireless device.

Further, besides the configurations of the first and second embodiments, a server that can communicate with the receiver may be included. The server acquires the residual capacity of the battery of the short-range wireless device from the receiver and when there a plurality of short-range wireless devices, the residual capacity of the battery of each device is shown by a list (database). The user is therefore able to find out the timing when the battery needs to be changed by checking the list of the server.

The program executed by the MCU (CPU) stated above can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, RandomAccess Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the invention made by the present inventors has been specifically described based on the embodiments, it is needless to say that the present invention is not limited to the embodiments already stated above and various changes may be made on the embodiments without departing from the spirit of the present invention.

The above embodiments may be expressed as shown below.

(Supplementary Note 1)

A radio receiving apparatus comprising:
a radio receiving unit that receives a radio signal transmitted from a radio transmitting apparatus;
a received signal strength measurement unit that measures changes of a received signal strength of the radio signal that has been received; and
a power supply state detection unit that detects a state of a power supply of the radio transmitting apparatus based on the changes of the received signal strength that has been measured.

(Supplementary Note 2)

A radio receiving apparatus comprising:
a radio receiving unit that receives a radio signal transmitted from a radio transmitting apparatus;
a received signal strength measurement unit that measures a received signal strength of the radio signal that has been received; and
a power supply state detection unit that detects a state of a power supply of the radio transmitting apparatus based on a result of comparing a predetermined value with the received signal strength that has been measured.

(Supplementary Note 3)

An information transmitting system comprising:
a transmission apparatus; and
a reception apparatus, wherein:
the transmission apparatus comprises:
a power supply voltage measurement unit that measures a power supply voltage;
a transmission power determination unit that determines a transmission power based on the power supply voltage; and
a transmission unit that transmits an advertisement packet including transmission power information indicating the transmission power that has been determined based on the transmission power that has been determined, and
the reception apparatus comprises a reception unit that receives information on the state of the power supply of the transmission apparatus from the transmission power information included in the advertisement packet.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A radio transmitting apparatus comprising:
a power supply voltage measurement unit that measures a power supply voltage;
a transmission power determination unit that determines a transmission power based on the power supply voltage that has been measured; and
a radio transmitting unit that transmits by radio a plurality of advertisement packets including transmission power information indicating the determined transmission power, wherein a residual capacity of a battery is represented by the plurality of the advertisement packets and a combination of the transmission power information of the plurality of the advertisement packets indicates the residual capacity of a battery.

2. The radio transmitting apparatus according to claim 1, wherein:
the advertisement packets are iBeacon (registered trademark) packets in compliance with Bluetooth (registered trademark) protocol, and
the transmission power information is Measured Power of the iBeacon packets.

3. The radio transmitting apparatus according to claim 1, wherein the transmission power determination unit changes the transmission power according to a decrease in the power supply voltage that has been measured.

4. The radio transmitting apparatus according to claim 3, wherein the transmission power determination unit changes the transmission power every time one of the advertisement packets is transmitted when the residual capacity of the battery is below a threshold value.

5. The radio transmitting apparatus according to claim 3, wherein the transmission power determination unit changes the transmission power when the power supply voltage that has been measured is lower than a threshold value of the power supply voltage corresponding to a timing when the battery, which supplies the power supply voltage, should be changed.

6. The radio transmitting apparatus according to claim 1, further comprising:
a storage unit that stores a transmission power pattern table, the transmission power pattern table associating the power supply voltage with a transmission power pattern indicating the transmission power for every transmission of the advertisement packets, and
the transmission power determination unit determines the transmission power according to the power supply voltage that has been measured based on the transmission power pattern table.

7. The radio transmitting apparatus according to claim 1, further comprising:
a storage unit that stores a transmission power pattern table, the transmission power pattern table associating a transmission power pattern indicating the transmission power for every transmission of the advertisement packets with the residual capacity of the battery which supplies the power supply voltage,
wherein the transmission power determination unit determines the transmission power according to the residual capacity of the battery corresponding to the power supply voltage that has been measured based on the transmission power pattern table.

8. The radio transmitting apparatus according to claim 1, wherein the radio transmitting unit comprises an attenuator that switches the transmission power of the advertisement packets according to a control signal corresponding to the transmission power that has been determined.

9. A radio transmitting apparatus comprising:
a power supply voltage measurement unit that measures a power supply voltage;
a transmission power determination unit that determines a transmission power of a plurality of advertisement packets based on a result of comparing a predetermined value with a value based on the power supply voltage; and
a radio transmitting unit that reduces the transmission power of the advertisement packets based on the determined transmission power from the transmission power determination unit,
wherein a residual capacity of a battery is represented by the plurality of the advertisement packets and a combination of the transmission power of the plurality of advertisement packets indicates the residual capacity of a battery.

10. The radio transmitting apparatus according to claim 9, wherein the radio transmitting unit changes the transmission power when the transmission power determination unit determines the value based on the power supply voltage is less than the predetermined value.

11. A radio receiving apparatus comprising:
a radio receiving unit that receives a plurality of the advertisement packets; and
a power supply state detection unit that detects a state of a power supply of a transmission apparatus that transmitted the advertisement packets based on transmission power information included in the advertisement packets,
wherein the state of the power supply of a transmission apparatus is represented by the plurality of the advertisement packets and a combination of the transmission power information included in the plurality of the advertisement packets indicates the state of the power supply of a transmission apparatus.

12. The radio receiving apparatus according to claim 11, further comprising:
a received signal strength measurement unit that measures a received signal strength of a plurality of radio signals including the advertisement packets received by the radio receiving unit,
wherein the power supply state detection unit detects the state of the power supply of the transmission apparatus based on the transmission power information included in the advertisement packet and the received signal strength that has been measured.

13. The radio receiving apparatus according to claim 11, wherein:
the advertisement packets are iBeacon (registered trademark) packets in compliance with Bluetooth (registered trademark) protocol, and
the transmission power information is Measured Power of the iBeacon packets.

14. The radio receiving apparatus according to claim 11, wherein the power supply state detection unit detects the state of the power supply based on changes of the transmission power information for each of the advertisement packets that has been received.

15. The radio receiving apparatus according to claim 14, wherein the power supply state detection unit detects a decrease in a power supply voltage of the transmission apparatus based on the changes of the transmission power information.

16. The radio receiving apparatus according to claim 14, wherein the power supply state detection unit detects a timing when a battery, which is the power supply of the transmission apparatus, should be changed based on the changes of the transmission power information.

17. The radio receiving apparatus according to claim 11, further comprising:
a storage unit that stores a received signal strength pattern table, the received signal strength pattern table associating a received signal strength pattern indicating a received signal strength for each of the advertisement packets to be received with a power supply voltage of the radio transmitting apparatus, wherein the power supply state detection unit detects the power supply voltage according to the transmission power information based on the received signal strength pattern table.

18. The radio receiving apparatus according to claim 11, further comprising:

a storage unit that stores a received signal strength pattern table, the received signal strength pattern table associating a received signal strength pattern indicating a received signal strength for each of the advertisement packets to be received with a residual capacity of a battery which is the power supply of the radio transmitting apparatus, wherein the power supply state detection unit detects the residual capacity of the battery according to the transmission power information based on the received signal strength pattern table.

* * * * *